(12) United States Patent
Katagami et al.

(10) Patent No.: US 7,671,527 B2
(45) Date of Patent: Mar. 2, 2010

(54) SUBSTRATE HAVING COLOR ELEMENTS AND BANKS WITH DIFFERENT LIQUID-REPELLENCY, FILM FORMATION METHOD, ELECTRO OPTICAL DEVICE, AND ELECTRONIC EQUIPMENT

(75) Inventors: Satoru Katagami, Hara-mura (JP); Atsushi Fukuda, Iwata (JP)

(73) Assignee: Seiko Epson Corporation, Tokyo (JP)

( * ) Notice: Subject to any disclaimer, the term of this patent is extended or adjusted under 35 U.S.C. 154(b) by 1086 days.

(21) Appl. No.: 11/330,267

(22) Filed: Jan. 12, 2006

(65) Prior Publication Data
US 2006/0159895 A1    Jul. 20, 2006

(30) Foreign Application Priority Data
Jan. 20, 2005    (JP)    ............................. 2005-012411

(51) Int. Cl.
H01J 1/62    (2006.01)
H01J 63/04    (2006.01)

(52) U.S. Cl. ................. 313/500; 313/498; 313/506; 313/509

(58) Field of Classification Search .......... 313/498–512
See application file for complete search history.

(56) References Cited

U.S. PATENT DOCUMENTS

| | | | | |
|---|---|---|---|---|
| 5,032,768 | A | * | 7/1991 | Lee et al. ................. 313/582 |
| 6,008,582 | A | * | 12/1999 | Asano et al. ............. 313/582 |
| 6,022,647 | A | | 2/2000 | Hirose et al. |
| 6,259,198 | B1 | * | 7/2001 | Yanagisawa et al. ........ 313/495 |
| 6,630,274 | B1 | | 10/2003 | Kiguchi et al. |
| 6,713,959 | B1 | * | 3/2004 | Toyoda et al. ............. 313/582 |
| 6,776,844 | B2 | | 8/2004 | Yonekura et al. |
| 6,830,494 | B1 | | 12/2004 | Yamazaki et al. |
| 6,949,328 | B2 | | 9/2005 | Ito et al. |
| 7,030,556 | B2 | * | 4/2006 | Adachi et al. ............. 313/506 |
| 7,271,535 | B2 | * | 9/2007 | Kobayashi ............... 313/504 |
| 7,371,508 | B2 | * | 5/2008 | Toyoda et al. ............ 430/321 |
| 2001/0026255 | A1 | * | 10/2001 | Sano et al. ................ 345/60 |
| 2002/0167268 | A1 | * | 11/2002 | Aruga et al. .............. 313/500 |
| 2003/0076038 | A1 | * | 4/2003 | Suzuki et al. ............. 313/582 |
| 2004/0000873 | A1 | * | 1/2004 | Moon ...................... 313/587 |
| 2004/0017152 | A1 | * | 1/2004 | Hashimoto et al. ......... 313/505 |
| 2004/0021413 | A1 | * | 2/2004 | Ito et al. .................. 313/504 |
| 2004/0075383 | A1 | * | 4/2004 | Endo et al. ............... 313/506 |
| 2004/0113555 | A1 | * | 6/2004 | Han et al. ................. 313/586 |
| 2004/0140759 | A1 | * | 7/2004 | Park et al. ................ 313/504 |

(Continued)

FOREIGN PATENT DOCUMENTS

CN    US1291289 A    4/2001

(Continued)

*Primary Examiner*—Nimeshkumar D. Patel
*Assistant Examiner*—Jose M Diaz
(74) *Attorney, Agent, or Firm*—Global IP Counselors, LLP

(57) ABSTRACT

A substrate having color elements includes a base member; a bank formed over the base member, the bank defining a plurality of color element areas; and color element films formed of liquid materials of a plurality of colors deposited in the color element areas. The bank has a different-color separation bank portion positioned between color element films of different colors, and a same-color separation bank portion positioned between color element films of the same color. A height of the different-color separation bank portion is greater than a height of the same-color separation bank portion.

8 Claims, 15 Drawing Sheets

U.S. PATENT DOCUMENTS

| | | | |
|---|---|---|---|
| 2005/0040759 A1* | 2/2005 | Kobayashi | 313/506 |
| 2005/0064305 A1* | 3/2005 | Katagami et al. | 430/7 |
| 2005/0153114 A1* | 7/2005 | Gupta et al. | 428/201 |

FOREIGN PATENT DOCUMENTS

| | | |
|---|---|---|
| JP | H11-194211 A | 7/1999 |
| JP | 2001-174622 A | 6/2001 |
| JP | 2001-185354 A | 7/2001 |
| JP | 2002-139614 A | 5/2002 |
| JP | 2002-373781 A | 12/2002 |
| JP | 2003121635 A * | 4/2003 |
| JP | 2004-4945 | 1/2004 |
| JP | 2004-111220 A | 4/2004 |
| JP | 2004-361492 A | 12/2004 |
| JP | 2005-12411 | 1/2005 |

* cited by examiner

SUBSTRATE HAVING COLOR ELEMENTS AND BANKS WITH DIFFERENT LIQUID-REPELLENCY, FILM FORMATION METHOD, ELECTRO OPTICAL DEVICE, AND ELECTRONIC EQUIPMENT

BACKGROUND

1. Technical Field

The present invention relates to a substrate having color elements, a film formation method, an electro optical device, and electronic equipment.

2. Related Art

A known method for manufacturing a substrate having color elements used in, for example, the color filter substrate of a liquid crystal display device or an organic electroluminescent display apparatus, entails depositing a liquid material to color element areas that are surrounded by banks and are formed on the substrate. This is achieved by discharging, as liquid droplets, a liquid material for forming a color element film using an inkjet drawing apparatus, and solidifying or curing the deposited liquid material to form the color element film.

In this type of method, the colors become mixed when the liquid material overflows the bank and enters the adjacent color element area of a different color.

On the other hand, the liquid material must be allowed to spread to every corner of the color element areas. Otherwise, there would be portions in which the color element film would not be formed, and those portions would become so-called colorless areas.

Furthermore, if the thickness of the color element film is not made uniform across the entire substrate having color elements, color variation results in an image that is displayed.

Due to such drawbacks in a substrate having color elements manufactured using the method described above, color mixing and colorless areas must be prevented and the thickness of the color element film must be made uniform. However, these requirements have not been easily satisfied.

SUMMARY

An advantage of the invention is to provide a high quality substrate having color elements that has a more uniform color element film thickness, and that can reduce color mixing and colorless areas, and a film formation method, an electro optical device, and electronic equipment having such substrate.

The substrate having color elements of an aspect of the invention includes a base member; a bank formed over the base member, the bank defining a plurality of color element areas; and color element films formed of liquid materials of a plurality of colors deposited in the color element areas. The bank has a different-color separation bank portion positioned between color element films of different colors, and a same-color separation bank portion positioned between color element films of the same color. A height of the different-color separation bank portion is greater than a height of the same-color separation bank portion.

In accordance with this aspect of the invention, since the liquid material does not overflow the different-color separation bank portion when deposited in the color element areas, occurrence of color mixing, which results when the liquid material mixes with the liquid material of a different color, can be reliably reduced. When the liquid material deposited in the color element areas overflows the same-color separation bank portion, the liquid material of the same color deposited in the adjacent color element areas of the same color can join and intermix. Therefore, even when the amount of liquid material deposited in the color element areas varies, the amount of liquid material deposited in each color element area is equalized approximately. Hence, the thickness of the resulting color element film can be made uniform. Since the liquid material furthermore overflows the same-color separation bank portion and spreads, the liquid material can be spread to every corner of the color element areas, making it possible to securely prevent formation of portions in which the color element film is not formed or has inadequate thickness; thereby reducing the formation of colorless areas. For this reason, a high quality substrate having color elements can be obtained in which the thickness of the color element film is uniform and the amount of color mixing and colorless areas is reduced.

In the substrate having color elements of this aspect of the invention, the height of the different-color separation bank portion and the height of the same-color separation bank portion satisfy $0.01 \leq H_2/H_1 \leq 0.99$, where $H_1$ is the height of the different-color separation bank portion and $H_2$ is the height of the same-color separation bank portion.

The above-described effects can thereby be reliably demonstrated.

In the substrate having color elements of this aspect of the invention, the plurality of color element areas are arranged in a stripe pattern.

Since the liquid material deposited in the color element areas spreads along each color row, the above-described effects can thereby be markedly demonstrated.

The substrate having color elements of still another aspect of the invention includes a base member; a bank formed over the base member, the bank defining a plurality of color element areas; and color element films formed of liquid materials of a plurality of colors deposited in the color element areas. The bank has a different-color separation bank portion positioned between color element films of different colors, and a same-color separation bank portion positioned between color element films of the same color. A liquid-repellency of an uppermost surface of the different-color separation bank portion with respect to the liquid materials is greater than a liquid-repellency of an uppermost surface of the same-color separation bank portion with respect to the liquid materials.

In accordance with this aspect of the present invention, since the liquid material does not overflow the different-color separation bank portion when deposited in the color element areas, occurrence of color mixing that results when the liquid material mixes with the liquid material of a different color can be reliably reduced. When the liquid material deposited in the color element areas overflows the same-color separation bank, the liquid material of the same color deposited in the adjacent color element areas of the same color can join and intermix. Therefore, even when the amount of liquid material deposited in the color element areas varies, the amount of liquid material deposited in each color element area is approximately equalized. Hence, the thickness of the resulting color element film can be made more uniform. Since the liquid material furthermore overflows the same-color separation bank portion and spreads, the liquid material can be wetted and spread to every corner of the color element areas, making it possible to securely reduce occurrence of formation of portions in which a color element film is not formed or has inadequate thickness, in other words formation of colorless areas. For this reason, a high quality substrate having color elements can be obtained in which the thickness of the color element film is more uniform and the amount of color mixing and colorless areas is reduced.

In the substrate having color elements of this aspect of the invention, the uppermost surface of the different-color separation bank portion and the uppermost surface of the same-color separation bank portion satisfy $0.01 \leq \beta/\alpha \leq 0.99$, where $\alpha$ is a contact angle between the liquid materials and material forming the uppermost surface of the different-color separation bank portion, and $\beta$ is a contact angle between the liquid materials and material forming the uppermost surface of the same-color separation bank portion.

The above-described effects can thereby be reliably demonstrated.

In the substrate having color elements of this aspect of the invention, the plurality of color element areas are arranged in a stripe pattern.

Since the liquid material deposited in the color element areas spreads along each color row, the above-described effects can thereby be markedly demonstrated.

The substrate having color elements of still another aspect of the invention includes a base member; a bank formed over the base member, the bank defining a plurality of color element areas; and color element films formed of liquid materials of a plurality of colors deposited in the color element areas. The bank has a different-color separation bank portion positioned between color element films of different colors, and a same-color separation bank portion positioned between color element films of the same color. The different-color separation bank portion of the bank has a base portion and a liquid-repellent portion which is formed on the base portion, a liquid-repellency of the liquid-repellent portion with respect to the liquid materials being greater than a liquid-repellency of the base portion with respect to the liquid materials.

In accordance with this aspect of the invention, since the liquid material does not overflow the different-color separation bank portion when the liquid material is deposited in color element areas, occurrence of color mixing that results when the liquid material mixes with the liquid material of a different color can be reliably prevented. The liquid material deposited in the color element areas overflows the same-color separation bank portion, and the liquid material of the same color deposited in the adjacent color element areas of the same color can join and intermix. Therefore, even when the amount of liquid material deposited in the color element areas varies, the amount of liquid material deposited in each color element area is equalized approximately. Hence, the thickness of the resulting color element film can be made more uniform. Since the liquid material furthermore overflows the same-color separation bank portion and spreads, the liquid material can be wetted and spread to every corner of the color element areas, making it possible to securely reduce occurrence of formation of portions in which a color element film is not formed or has inadequate thickness; in other words formation of colorless areas. For this reason, a high quality substrate having color elements can be obtained in which the thickness of the color element film is more uniform and the amount of color mixing and colorless areas is reduced.

In the substrate having color elements of this aspect of the invention, same-color separation bank portion of the bank has a base portion and a liquid-repellent portion which is formed on the base portion, a liquid-repellency of the liquid-repellent portion of the same-color separation bank portion with respect to the liquid materials being greater than a liquid-repellency of the base portion of the same-color separation bank portion with respect to the liquid materials. A width of the liquid-repellent portion of the different-color separation bank portion is greater than a width of the liquid-repellent portion of the same-color separation bank portion.

In accordance with this aspect of the invention, since the liquid material does not overflow the different-color separation bank portion when the liquid material is deposited in color element areas, occurrence of color mixing that results when the liquid material mixes with the liquid material of a different color can be reliably prevented. The liquid material deposited in the color element areas overflows the same-color separation bank portion, and the liquid material of the same color deposited in the adjacent color element areas of the same color can join and intermix. Therefore, even when the amount of liquid material deposited in the color element areas varies, the amount of liquid material deposited in each color element area is equalized approximately. Hence, the thickness of the resulting color element film can be made more uniform. Since the liquid material furthermore overflows the same-color separation bank portion and spreads, the liquid material can be wetted and spread to every corner of the color element areas, making it possible to securely reduce occurrence of formation of portions in which a color element film is not formed or has inadequate thickness; in other words formation of colorless areas. For this reason, a high quality substrate having color elements can be obtained in which the thickness of the color element film is more uniform and the amount of color mixing and colorless areas is reduced.

In the substrate having color elements of this aspect of the invention, the width of the liquid-repellent portion of the different-color separation bank portion and the width of the liquid-repellent portion of the same-color separation bank portion satisfy $W_2/W_1 \leq 0.99$, where $W_1$ is the width of the liquid-repellent portion of the different-color separation bank portion and $W_2$ is the width of the liquid-repellent portion of the same-color separation bank portion.

The above-described effects can thereby be reliably demonstrated.

In the substrate having color elements of this aspect of the invention, the plurality of color element areas are arranged in a stripe pattern.

Since the liquid material deposited in the color element areas spreads along each color row, the above-described effects can thereby be markedly demonstrated.

The film formation method of still another aspect of the invention includes forming a bank on a base member so as to define a plurality of color element areas; depositing liquid materials of a plurality of colors in the color element areas, and solidifying or curing the liquid materials deposited in the color element areas to form color element films. The bank is formed to have a different-color separation bank portion positioned between color element films of different colors and a same-color separation bank portion positioned between color element films of the same color, and a height of the different-color separation bank portion being made greater than a height of the same-color separation bank portion.

In accordance with this aspect of the invention, since the liquid material does not overflow the different-color separation bank portion when deposited in the color element areas, the occurrence of color mixing that results when the liquid material mixes with the liquid material of a different color can be reliably reduced. When the liquid material deposited in the color element areas overflows the same-color separation bank, the liquid material of the same color deposited in the adjacent color element areas of the same color can join and intermix. Therefore, even when the amount of liquid material deposited in the color element areas varies, the amount of liquid material deposited in each color element area is approximately equalized. Hence, the thickness of the resulting color element film can be made more uniform. Since the liquid material furthermore overflows the same-color separation bank and spreads, the liquid material can be wetted and spread to every corner of the color element areas, making it possible to securely reduce occurrence of formation of portions in which a color element film is not formed or has inadequate thickness; in other words formation of colorless areas. For this reason, a high quality substrate having color elements can be manufactured at a high yield in which the thickness of the color element film is more uniform and the amount of color mixing and colorless areas is reduced.

In the film formation method of this aspect of the invention, in the depositing of the liquid materials in the color element areas, the liquid materials are preferably discharged as droplets from a nozzle of a droplet discharge head.

Liquid material can thereby be deposited in a precise amount in a precise position.

In the film formation method of this aspect of the invention, in the depositing of the liquid materials in the color element areas, the liquid materials are deposited so that the droplets of the same color deposited in adjacent color element areas become joined over the same-color separation bank portion.

The thickness of the color element film can thereby be made more uniform, and occurrences of the color mixing and colorless areas can be reliably reduced.

The film formation method of still another aspect of the invention includes forming a bank on a base member so as to define a plurality of color element areas; depositing liquid materials of a plurality of colors in the color element areas, and solidifying or curing the liquid materials deposited in the color element areas to form color element films. The bank is formed to have a different-color separation bank portion positioned between color element films of different colors and a same-color separation bank portion positioned between color element films of the same color. The liquid-repellency of the uppermost surface of the different-color separation bank with respect to the liquid material is made greater than the liquid-repellency of the uppermost surface of the same-color separation bank with respect to the liquid materials.

In accordance with this aspect of the invention, since the liquid material does not overflow the different-color separation bank portion when deposited in the color element areas, the occurrence of color mixing that results when the liquid material mixes with the liquid material of a different color can be reliably reduced. When the liquid material deposited in the color element areas overflows the same-color separation bank, the liquid material of the same color deposited in the adjacent color element areas of the same color can join and intermix. Therefore, even when the amount of liquid material deposited in the color element areas varies, the amount of liquid material deposited in each color element area is approximately equalized. Hence, the thickness of the resulting color element film can be made more uniform. Since the liquid material furthermore overflows the same-color separation bank and spreads, the liquid material can be wetted and spread to every corner of the color element areas, making it possible to securely reduce occurrence of formation of portions in which a color element film is not formed or has inadequate thickness; in other words formation of colorless areas. For this reason, a high quality substrate having color elements can be manufactured at a high yield in which the thickness of the color element film is more uniform and the amount of color mixing and colorless areas is reduced.

In the film formation method of this aspect of the invention, in the depositing of the liquid materials in the color element areas, the liquid materials are preferably discharged as droplets from a nozzle of a droplet discharge head.

Liquid material can thereby be deposited in a precise amount in a precise position.

In the film formation method of this aspect of the present invention, in the depositing of the liquid materials in the color element areas, the liquid materials are deposited so that the droplets of the same color deposited in adjacent color element areas become joined over the same-color separation bank portion.

The thickness of the color element film can thereby be made more uniform, and occurrences of the color mixing and colorless areas can be reliably reduced.

The film formation method of still another aspect of the invention includes forming a bank on a base member so as to define a plurality of color element areas; depositing liquid materials of a plurality of colors in the color element areas, and solidifying or curing the deposited liquid materials in the color element areas to form color element films. The bank is formed to have a different-color separation bank portion positioned between color element films of different colors and a same-color separation bank portion positioned between color element films of the same color. The different-color separation bank portion of the bank is formed to have a base portion and a liquid-repellent portion which is formed on the base portion, a liquid-repellency of the liquid-repellent portion with respect to the liquid materials being greater than a liquid-repellency of the base portion with respect to the liquid materials.

In accordance with this aspect of the present invention, since the liquid material does not overflow the different-color separation bank portion when deposited in the color element areas, the occurrence of color mixing that results when the liquid material mixes with the liquid material of a different color can be reliably reduced. When the liquid material deposited in the color element areas overflows the same-color separation bank, the liquid material of the same color deposited in the adjacent color element areas of the same color can join and intermix. Therefore, even when the amount of liquid material deposited in the color element areas varies, the amount of liquid material deposited in each color element area is approximately equalized. Hence, the thickness of the resulting color element film can be made more uniform. Since the liquid material furthermore overflows the same-color separation bank and spreads, the liquid material can be wetted and spread to every corner of the color element areas, making it possible to securely reduce occurrence of formation of portions in which a color element film is not formed or has inadequate thickness; in other words formation of colorless areas. For this reason, a high quality substrate having color elements can be manufactured at a high yield in which the thickness of the color element film is more uniform and the amount of color mixing and colorless areas is reduced.

In the film formation method of this aspect of the invention, in the forming of the bank, the same-color separation bank portion of the bank is formed to have a base portion and a liquid-repellent portion which is formed on the base portion, a liquid-repellency of the liquid-repellent portion of the same-color separation bank portion with respect to the liquid materials being greater than a liquid-repellency of the base portion of the same-color separation bank portion with respect to the liquid materials. A width of the liquid-repellent portion of the different-color separation bank portion is made greater than the width of the liquid-repellent portion of the same-color separation bank portion.

In accordance with this aspect of the invention, since the liquid material does not overflow the different-color separation bank portion when deposited in the color element areas, the occurrence of color mixing that results when the liquid material mixes with the liquid material of a different color can be reliably reduced. When the liquid material deposited in the color element areas overflows the same-color separation bank, the liquid material of the same color deposited in the adjacent color element areas of the same color can join and intermix. Therefore, even when the amount of liquid material deposited in the color element areas varies, the amount of liquid material deposited in each color element area is approximately equalized. Hence, the thickness of the resulting color element film can be made more uniform. Since the liquid material furthermore overflows the same-color separation bank and spreads, the liquid material can be wetted and spread to every corner of the color element areas, making it possible to securely reduce occurrence of formation of portions in which a color element film is not formed or has inadequate thickness; in other words formation of colorless areas. For this reason, a high quality substrate having color elements can be manufactured at a high yield in which the thickness of the color element film is more uniform and the amount of color mixing and colorless areas is reduced.

In the film formation method of this aspect of the invention, in the depositing of the liquid materials in the color element areas, the liquid materials are preferably discharged as droplets from a nozzle of a droplet discharge head.

Liquid material can thereby be deposited in a precise amount in a precise position.

In the film formation method of this aspect of the present invention, in the depositing of the liquid materials in the color element areas, the liquid materials are deposited so that the droplets of the same color deposited in adjacent color element areas become joined over the same-color separation bank portion.

The thickness of the color element film can thereby be made more uniform, and occurrences of the color mixing and colorless areas can be reliably reduced.

The electro optical device of still another aspect of the invention is provided with the substrate having color elements of the above-described aspect of the invention.

A low cost electro optical device can be provided having high image quality and less color variability.

The electronic equipment of still another aspect of the invention is provided with the electro optical device of the above-described aspect of the invention.

Low cost electronic equipment can be provided having high image quality and less color variability.

BRIEF DESCRIPTION OF THE DRAWINGS

FIG. 4 is a diagram showing the droplet discharge head in the drawing apparatus shown in FIG. 1, wherein FIG. 4A is a perspective view and FIG. 4B is a cross-sectional side view;

DESCRIPTION OF EXEMPLARY EMBODIMENTS

The substrate having color elements, film formation method, electro optical device, and electronic equipment as embodiments of the invention are described in detail below using preferred embodiments shown in the attached diagrams.

The film formation method in accordance with an embodiment the invention is a method for forming the color element film of a substrate having color elements. Described in the present embodiment is the case in which an example of the invention has been applied to a color filter substrate 10, which is a constituent element of a liquid crystal display device, as an example of a substrate having color elements.

Described first with reference to FIGS. 1 to 6 is a drawing apparatus in which the film formation method in accordance with an embodiment of the invention is used.

Figure 1:
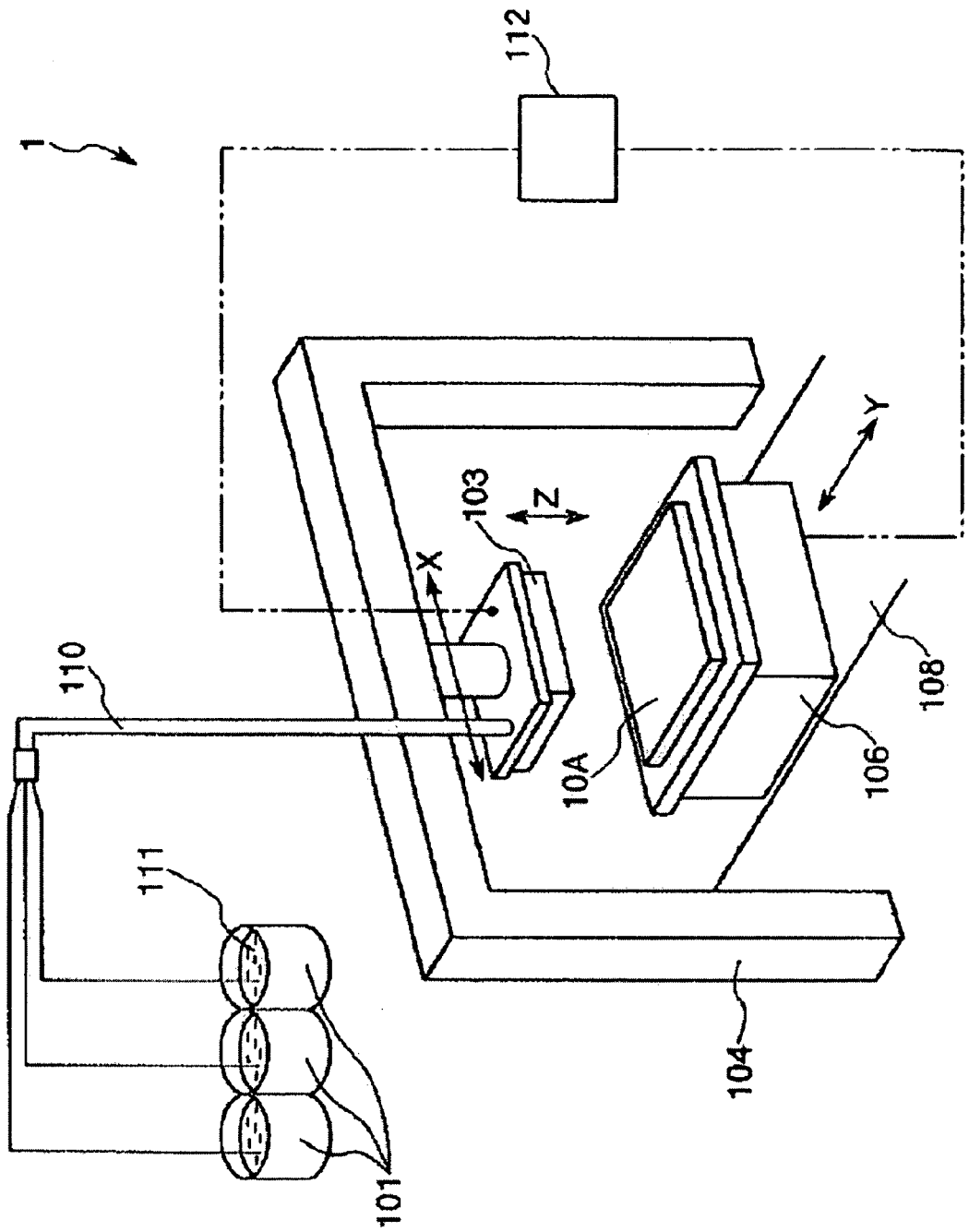
FIG. 1 is a perspective view showing the drawing apparatus used in the film formation method of an embodiment of the invention.

A drawing apparatus (inkjet drawing apparatus) 1 is provided with a head unit 103 having a plurality of discharge heads 2 mounted on a carriage 105, a carriage movement mechanism (movement device) 104 for moving the head unit 103 in a horizontal direction (hereinafter referred to as "X-axis direction"), a stage 106 for holding a later-described substrate 10A having a bank, a stage movement mechanism (movement device) 108 for moving the stage 106 in a horizontal direction which is orthogonal to the X-axis direction (hereinafter referred to as "Y-axis direction"), and a control device 112, as shown in FIG. 1.

Also, three tanks 101 for storing a liquid material 111 of three colors, namely, red (R), green (G), and blue (B), is disposed in the vicinity of the drawing apparatus 1. The tanks 101 and head unit 103 are connected by way of a tube 110, which forms a channel for feeding liquid material 111. The liquid material 111 stored in the tanks 101 is fed (supplied) to the droplet discharge heads 2 of the head unit 103.

As used herein, the term "liquid material" refers to a substance that contains a material used for forming the color elements of a substrate having color elements, and that has a viscosity that permits discharge from the nozzle 25 of a droplet discharge head 2. In this case, the material may be waterbased or oil-based. The material should have fluidity (viscosity) that allows discharge from the nozzles 25, and should remain an overall fluid even if a solid substance is dispersed therein. Specifically, the liquid material is one in which the constituent material of the color element film is dissolved or dispersed in a solvent, and may be a solution or a dispersion (suspension or emulsion).

The liquid material 111 in the present embodiment is an organic solvent ink obtained by dissolving or dispersing in an organic solvent pigment for forming a filter film, which is the color element film, in the color element areas of the color filter substrate 10.

In the following description, when the red, green, and blue liquid material 111 is differentiated, the reference numerals 111R, 111G, and 111B are affixed, and when the colors are not differentiated, the liquid material is generically referred to as "liquid material 111."

The operation of the carriage movement mechanism 104 is controlled by the control device 112. The carriage movement mechanism 104 of the present embodiment has a function for moving the head unit 103 along the Z-axis direction (vertical direction) and adjusting the height. The carriage movement mechanism 104 furthermore has a function for rotating the head unit 103 about an axis parallel to the Z axis, and the angle about the Z axis of the head unit 103 can thereby be finely adjusted.

The stage 106 has a flat surface parallel to both the X- and Y-axis directions. The stage 106 is configured so as to fix or hold the substrate 10A having a bank to the flat surface thereof, in order to manufacture a color filter substrate 10.

The stage movement mechanism 108 moves the stage 106 along the Y-axis direction, which is orthogonal to both the X- and Z-axis directions, and the operation thereof is controlled by the control device 112. Furthermore, the stage movement mechanism 108 of the present embodiment has a function for rotating the stage 106 about the axis parallel to the Z axis, and the slope about the Z axis of the substrate 10A having a bank mounted on the stage 106 can be finely adjusted and the orientation thereof corrected so as to set the substrate exactly straight.

As described above, the head unit 103 is moved in the X-axis direction by the carriage movement mechanism 104. The stage 106 is moved in the Y-axis direction by the stage movement mechanism 108. Specifically, the relative position of the head unit 103 with respect to the stage 106 is changed by the carriage movement mechanism 104 and the stage movement mechanism 108.

The details of the configuration and function of the control device 112 are described later.

Figure 2:
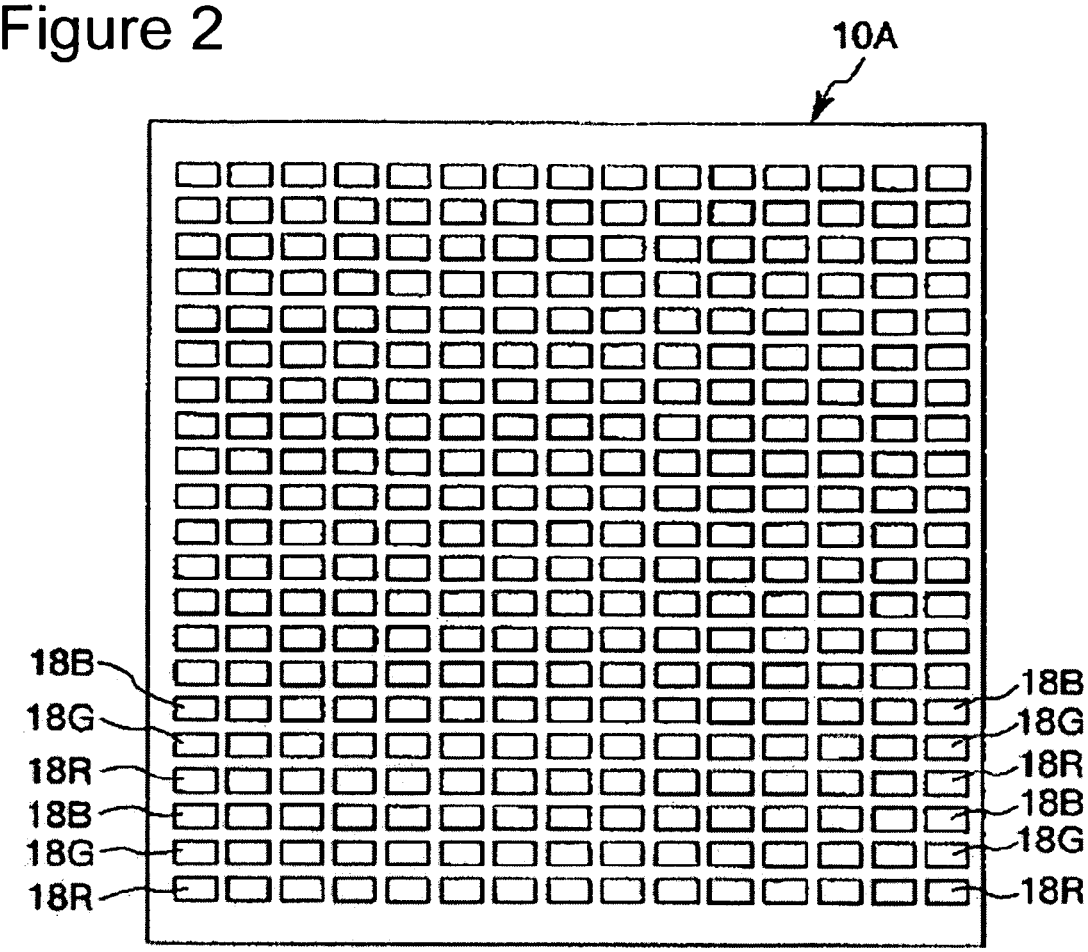
FIG. 2 is a top view showing the head unit and substrate having a bank in the drawing apparatus shown in FIG. 1.
Figure 2:
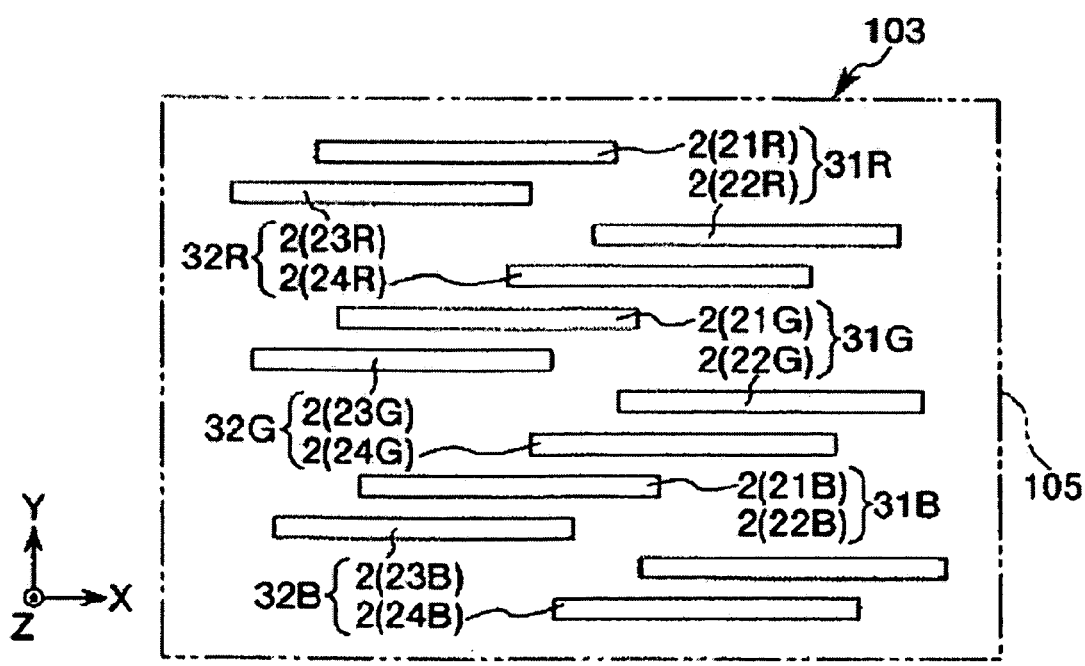

FIG. 2 is a top view showing the head unit 103 and the substrate 10A having a bank in the drawing apparatus 1 shown in FIG. 1.

The head unit 103 shown in FIG. 2 has a configuration in which a plurality of droplet discharge heads 2 are mounted in a carriage 105. In FIG. 2, the carriage 105 is indicated by a virtual line (alternate long and two short dashes line). The solid lines indicating the droplet discharge heads 2 show the position of the nozzle surface (nozzle plate 128) of the droplet discharge heads 2.

A total of 12 droplet discharge heads 2 are disposed in the head unit 103, namely, four droplet discharge heads 2 consisting of a first head 21R, second head 22R, third head 23R, and fourth head 24R for discharging red liquid material 111R; four droplet discharge heads 2 consisting of a first head 21G, second head 22G, third head 23G, and fourth head 24G for discharging green liquid material 111G; and four droplet discharge heads 2 consisting of a first head 21B, second head 22B, third head 23B, and fourth head 24B for discharging blue liquid material 111B.

The method of arranging the droplet discharge heads 2 shown in FIG. 2 is an example, and it is apparent that no limitation is imposed thereby.

In the description below, when the droplet discharge heads 2 are referred to generically, the term "droplet discharge heads 2" is used, and when referred to individually, the terms "first head 21R, second head 22R, . . . " are used.

The substrate 10A having a bank shown in FIG. 2 is used for manufacturing a color filter substrate 10 with a stripe array. A large number of red color element areas (subpixels) 18R, green color element areas (subpixels) 18G, and blue color element areas (subpixels) 18B are provided to the substrate 10A having a bank. The color element areas 18R, 18G, and 18B are substantially rectangular.

The substrate 10A having a bank is held on the stage 106 in an orientation in which the long-axis direction is parallel to the X-axis direction, and the short-axis direction is parallel to the Y-axis direction of the color element areas 18R, 18G, and 18B. The three color element areas 18R, 18G, and 18B are repeatedly arrayed in this order along the Y-axis direction on the substrate 10A having a bank, and the color element areas 18R, 18G, and 18B are continuously arrayed for each color along the X-axis direction. A single group of color element areas 18R, 18G, and 18B aligned in Y-axis direction corresponds to a single pixel unit of the manufactured color filter substrate 10.

The substrate 10A having a bank is later described in greater detail.

Figure 3:
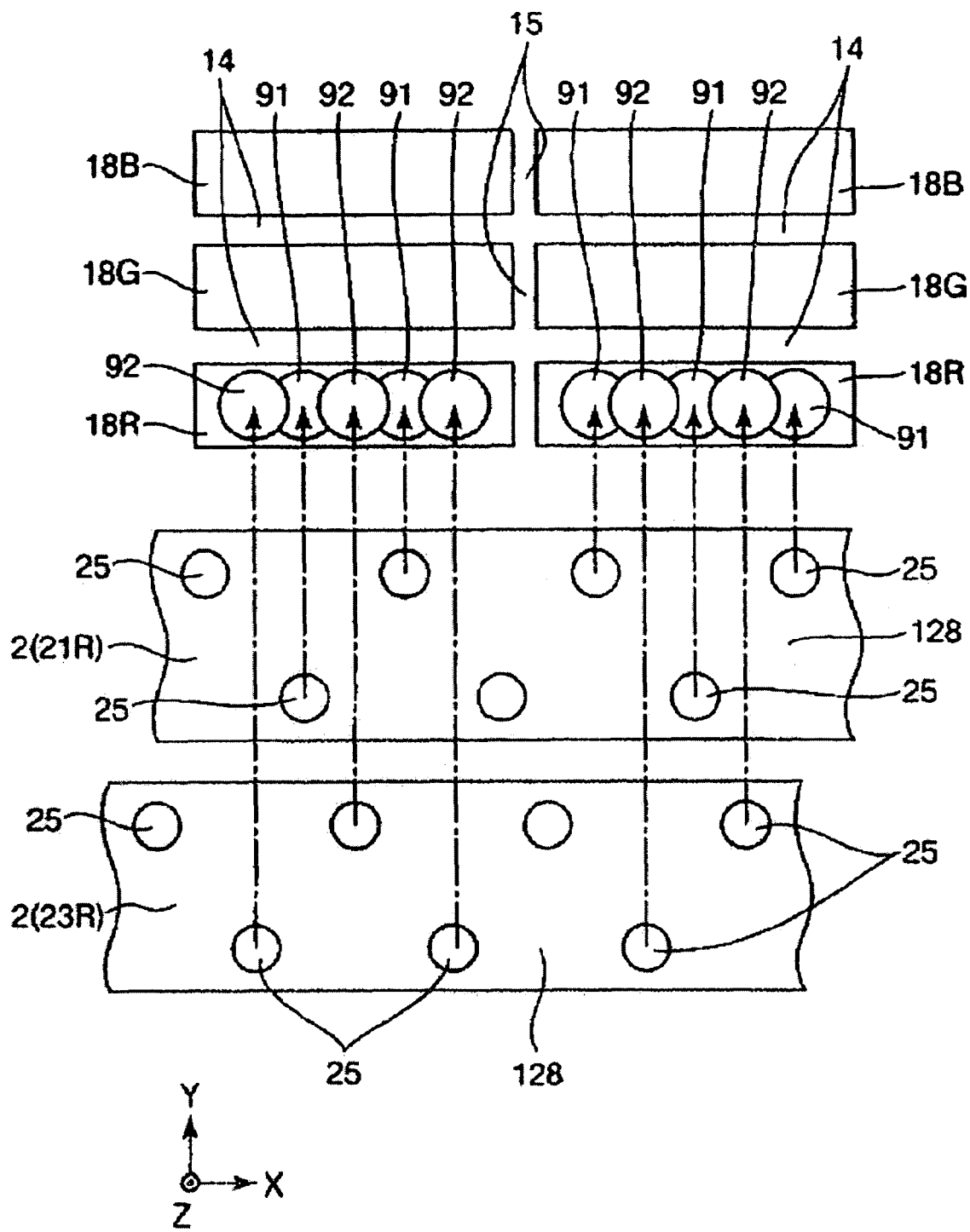
FIG. 3 is a top view showing an enlarged portion of the nozzle surface (nozzle plate) of the droplet discharge head, and the color element area of the substrate having a bank.
Figure 4:
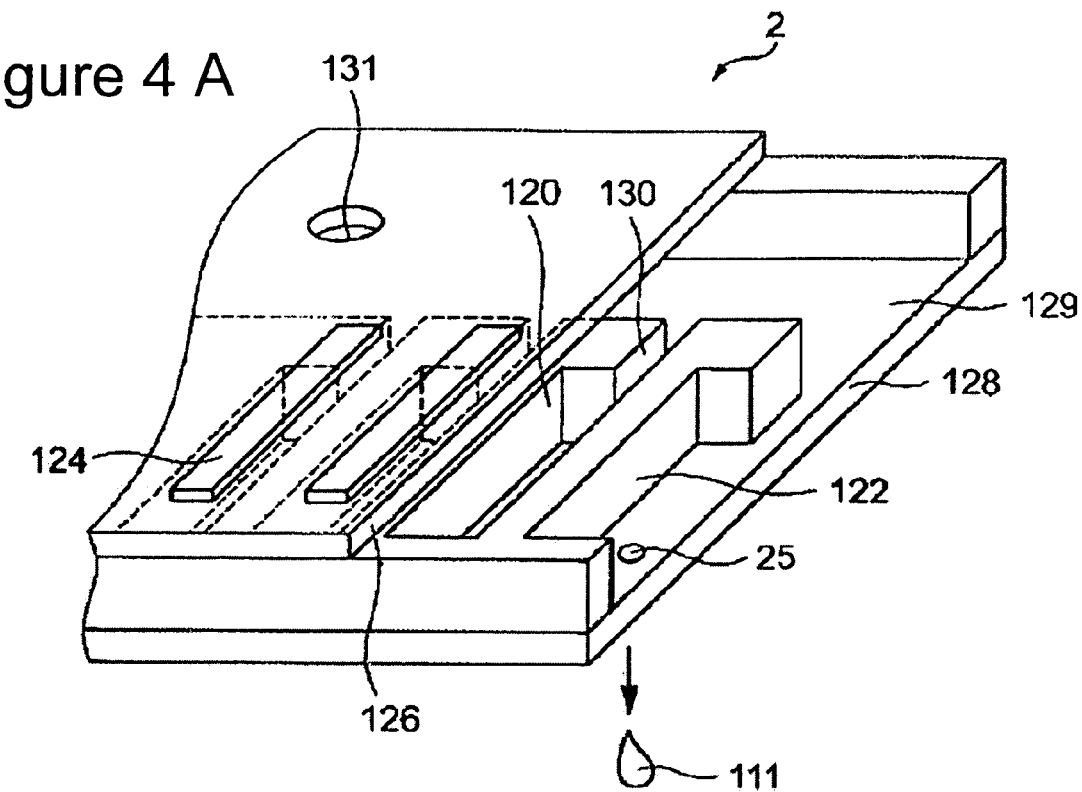
Figure 4:
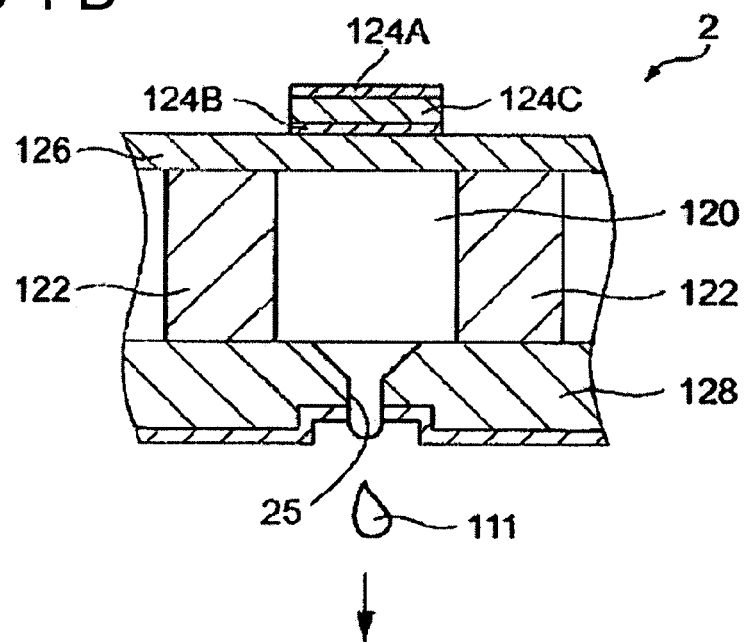

FIG. 3 is a top view showing an enlarged portion of the nozzle surface (nozzle plate 128) of the droplet discharge heads 2, and the color element areas 18R, 18G, and 18B of the substrate 10A having a bank. The nozzle surface of the droplet discharge heads 2 is disposed in the direction facing the substrate 10A having a bank, that is, facing in the vertically downward direction, and the nozzle surface of the droplet discharge heads 2 is indicated by a solid line for clarity in FIG. 3.

A large number of nozzles (nozzle holes) 25 is formed on the nozzle surface of the droplet discharge head 2 in a straight line at equal intervals along the X-axis direction to form a nozzle row. In the present embodiment, two nozzle rows are formed in parallel at half pitch on a single droplet discharge heads 2, and the number of nozzle rows possessed by a single droplet discharge head 2 may be a single row or three or more rows. The number of nozzles 25 formed on a single droplet discharge head 2 is not particularly limited, but the number is ordinarily about several tens to several hundreds.

The drawing apparatus 1 operates so that the actuation of the stage movement mechanism 108 moves the substrate 10A having a bank held on the stage 106 in the Y-axis direction, and passes the substrate below the head unit 103 as droplets of liquid material 111 are discharged from the nozzles 25 of the droplet discharge heads 2 of the head unit 103 and are deposited in the color element areas 18R, 18G, and 18B on the substrate 10A having a bank. This operation is referred to as "main scanning."

Droplets 91 and 92 of red liquid material 111R can thereby be landed in the red color element area 18R, as shown in FIG. 3, for example. In the particular configuration of the diagram, the droplets discharged from the two droplet discharge heads 2, the droplets 91 discharged from the nozzles 25 of the first head 21R, and the droplets 92 discharged from the nozzles 25 of the third head 23R, for example, can be landed in a single red color element area 18R.

In a similar fashion, the drawing apparatus 1 operates so as to land a droplet of green liquid material 111G in the green color element area 18G, and to land blue liquid material 111B in the blue color element area 18B.

When the width in the X-axis direction of the substrate 10A having a bank is less than the length in the X-axis direction of the entire head unit 103 in which the liquid material 111 can be discharged to the substrate 10A having a bank, the liquid material 111 can be deposited to the entire substrate 10A having a bank by carrying out a single main scan between the head unit 103 and substrate 10A having a bank.

In contrast, when the width in the X-axis direction of the substrate 10A having a bank is greater than the entire discharge width of the head unit 103, liquid material 111 can be deposited to the entire surface of the substrate 10A having a bank by alternately repeating the movement of the head unit 103 and substrate 10A having a bank (main scanning), and the movement in the X-axis direction of the head unit 103 by the operation of the carriage movement mechanism 104 (hereinafter referred to as "sub-scanning").

The droplet discharge head 2 is an inkjet head, as shown in FIGS. 4A and B. In more specific terms, the droplet discharge head 2 is provided with a vibration plate 126 and a nozzle plate 128. A liquid reservoir 129 that is kept filled with liquid material 111 fed from the tank 101 via a hole 131 is positioned between the vibration plate 126 and the nozzle plate 128.

A plurality of partition walls 122 are also positioned between the vibration plate 126 and the nozzle plate 128. The portion surrounded by the vibration plate 126, the nozzle plate 128, and a pair of partition walls 122 is a cavity 120. The cavity 120 is disposed in correspondence with the nozzle 25, so the number of cavities 120 and the number of nozzles 25 are the same. Liquid material 111 is fed from the liquid reservoir 129 to the cavity 120 via a supply port 130 positioned between the pair of partition walls 122.

Vibrators 124 are positioned on the vibration plate 126 in correspondence with the cavities 120, as drive elements for varying the pressure of the liquid material 111 filled in the cavities 120. Each vibrator 124 has a piezoelement 124C, and a pair of electrodes 124A and 124B on both sides of the piezoelement 124C. By imparting a drive voltage between the pair of electrodes 124A and 124B, liquid material 111 is discharged from the corresponding nozzles 25. The shape of the nozzles 25 are adjusted so that liquid material 111 is discharged from the nozzles 25 in the Z-axis direction.

The control unit 112 may be configured so as to impart a signal to each of the plurality of vibrators 124 in a mutually independent fashion. In other words, the volume of the material 111 discharged from the nozzles 25 may be controlled for each nozzle 25 in accordance with a signal from the control unit 112. The droplet discharge head 2 is not limited to one in which a piezoelectric actuator as shown in the diagram serves as the drive element, and an electrostatic actuator may be used, or a configuration in which droplets are discharged through thermal expansion of the liquid material 111 using an electrothermal converter may be used.

Figure 5:
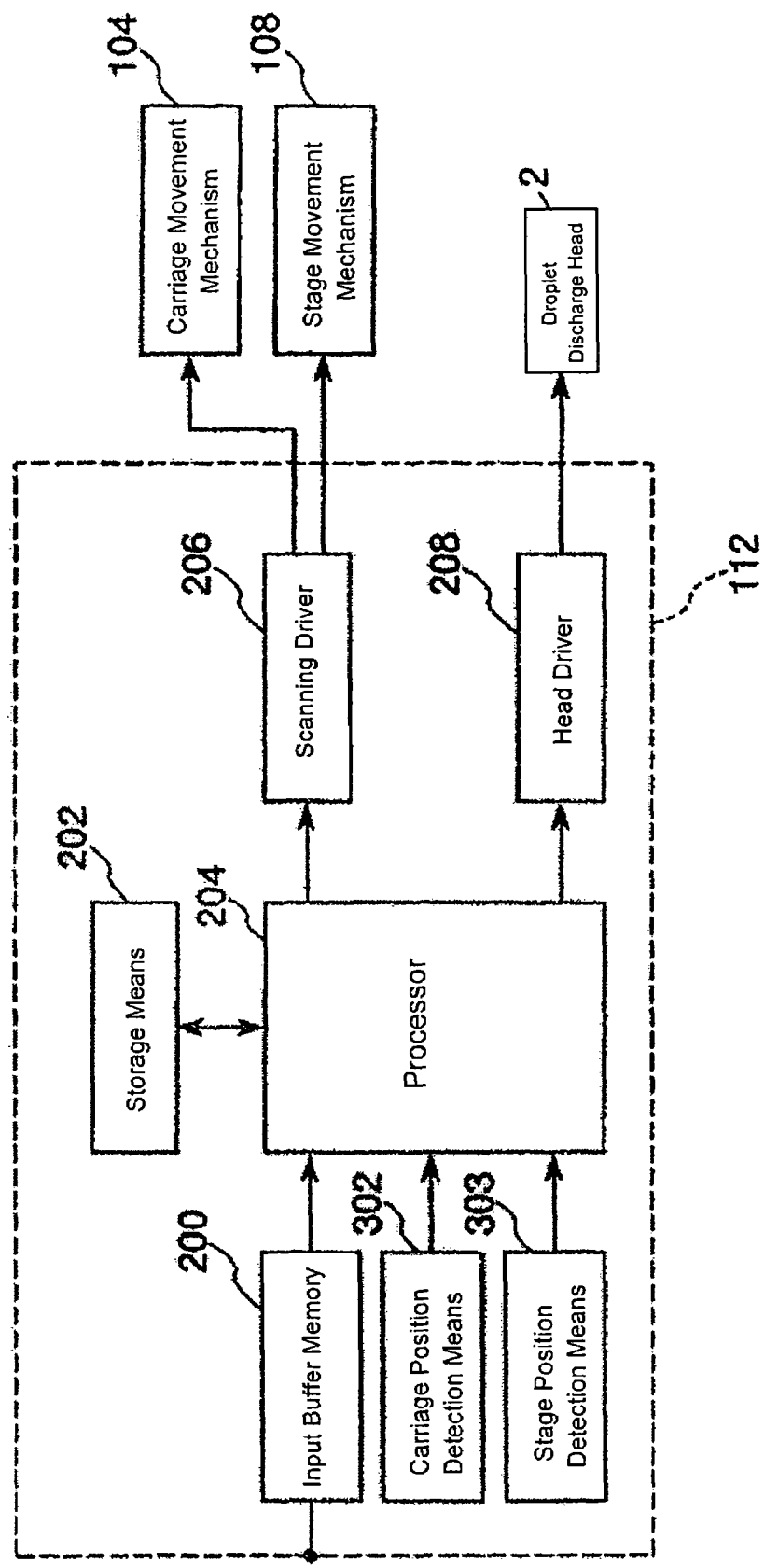
FIG. 5 is a block diagram showing the configuration of the control device in the drawing apparatus shown in FIG. 1.
Figure 6:
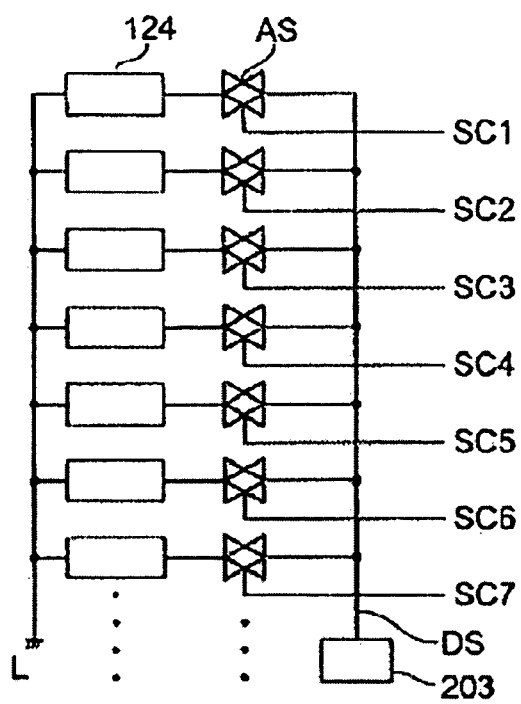
FIG. 6A is a schematic diagram showing the head drive unit.
FIG. 6B is a timing chart showing the drive signal, select signal, and discharge signal in the head drive unit.
Figure 6:
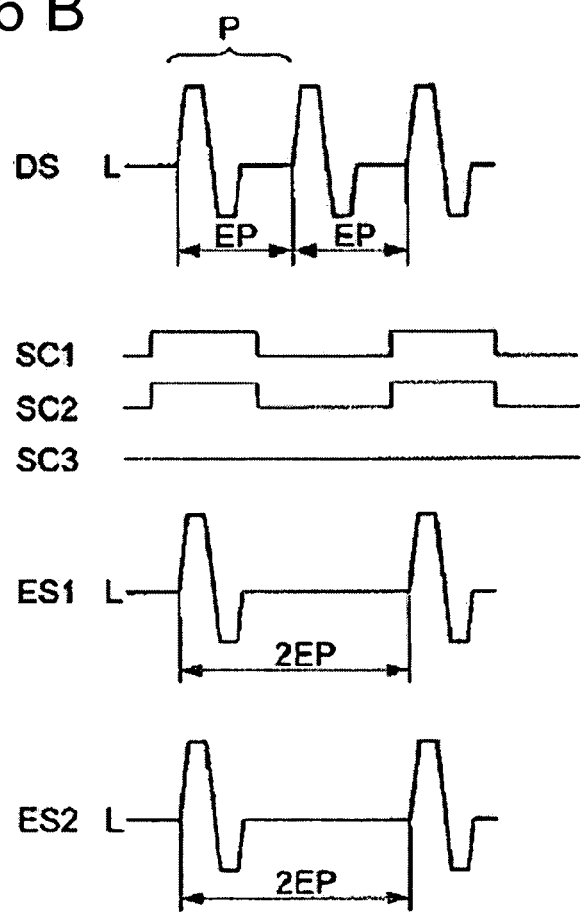

Next, the configuration of the control unit 112 is described. The control unit 112 has an input buffer memory 200, a storage device 202, a processor 204, a scan drive unit 206, a head drive unit 208, a carriage position detection device 302, and a stage position detection device 303, as shown in FIG. 5.

The input buffer memory 200 and processor 204 are mutually communicably connected. The processor 204 and the storage device 202 are mutually communicably connected. The processor 204 and scan drive unit 206 are mutually communicably connected. The processor 204 and head drive unit 208 are mutually communicably connected. The scan drive unit 206 is mutually communicably connected with the carriage movement mechanism 104 and the stage movement mechanism 108. In a similar fashion, the head drive unit 208 is mutually communicably connected with each of the plurality of heads 2.

The input buffer memory 200 receives data related to the position for discharging droplets of the liquid material 111 from an external information processing apparatus, in other words, drawing pattern data. The input buffer memory 200 feeds the drawing pattern data to the processor 204, and the processor 204 stores the drawing pattern data in the storage device 202. The storage device 202 is composed of a RAM, a magnetic recording medium, an optical recording medium, or the like.

The carriage position detection device 302 detects the position (movement distance) of the carriage 105, in other words, the head unit 103 in the X-axis direction, and inputs the detection signal to the processor 204.

The stage position detection device 303 detects the position (movement distance) of the stage 106, in other words, the substrate 10A having a bank in the Y-axis direction, and inputs the detection signal to the processor 204.

The carriage position detection device 302 and stage position detection device 303 are composed of a linear encoder, laser length measuring device, and the like, for example.

The processor 204 controls (closed-loop control) the operation of the carriage movement mechanism 104 and stage movement mechanism 108 by way of the scan drive unit 206 on the basis of the detection signals of the carriage position detection device 302 and the stage position detection device 303, and controls the positions of the head unit 103 and the substrate 10A having a bank.

The processor 204 furthermore controls the movement speed of the stage 106, in other words, the substrate 10A having a bank by controlling the operation of the stage movement mechanism 108.

The processor 204 provides selection signals SC to the head drive unit 208 indicating the ON/OFF state of the nozzles 25 with each discharge cycle on the basis of the drawing pattern data. The head drive unit 208 presents to the discharge head 2 ejection signals ES required for discharging liquid material 111 on the basis of the selection signals SC. As a result, the liquid material 111 is discharged from the corresponding nozzles 25 in the discharge head 2.

The control device 112 may be a computer having a CPU, ROM, and RAM. In this case, the above-described functions of the control device 112 are implemented by software programming to be executed by the computer. The control device 112 may naturally be implemented by dedicated circuitry (hardware).

Next, the configuration and function of the head drive unit 208 in the control unit 112 are described.

The head drive unit 208 has a single drive signal generator 203 and a plurality of analog switches AS, as shown in FIG. 6A. The drive signal generator 203 generates a drive signal DS, as shown in FIG. 6B. The electric potential of the drive signal DS varies with time in relation to a reference electric potential L. Specifically, the drive signal DS contains a plurality of discharge waveforms P that are repeated in the discharge cycle EP. Here, each of the discharge waveforms P corresponds to the drive voltage waveform that is to be applied between the pairs of electrodes of the corresponding vibrators 124 in order to discharge a single droplet from nozzles 25.

The drive signal DS is fed to the input terminal of each analog switch AS. Each analog switch AS is disposed in correspondence with a nozzle 25. In other words, the number of analog switches AS and the number of nozzles 25 are the same.

The processor 204 provides selection signals SC indicating the ON/OFF state of the nozzles 25 to the individual analog switches AS. Here, the selection signals SC can assume either a high level or a low level independently for each analog switch AS. The analog switches AS feed ejection signals ES to the electrodes 124A of the vibrators 124 in accordance with the drive signal DS and selection signals SC. Specifically, when the selection signals SC are at a high level, the analog switches AS transmit a drive signal DS as an ejection signal ES to the electrodes 124A. When the selection signals SC are at a low level, the electric potential of the ejection signal ES output by the analog switches AS is the reference electric potential L. When a drive signal DS is provided to the electrodes 124A of the vibrators 124, the liquid material 111 is discharged from the nozzles 25 corresponding to the vibrators 124. A reference potential L is provided to each of the electrodes 124B of the vibrators 124.

In the two individual ejection signals ES in the example shown in FIG. 6B, a high level period and a low level period are set in the two individual selection signals SC, so that the discharge waveform P is expressed by cycle 2EP, which is twice as long as the discharge cycle EP. Liquid material 111 is thereby discharged in the cycle 2EP from each of the two corresponding nozzles 25. Also, the shared drive signal DS is provided at a high level from the shared drive signal generator 203 to the corresponding vibrators 124 of these two nozzles 25. For this reason, the liquid material 111 is discharged with substantially the same timing from these two nozzles 25.

Figure 7:
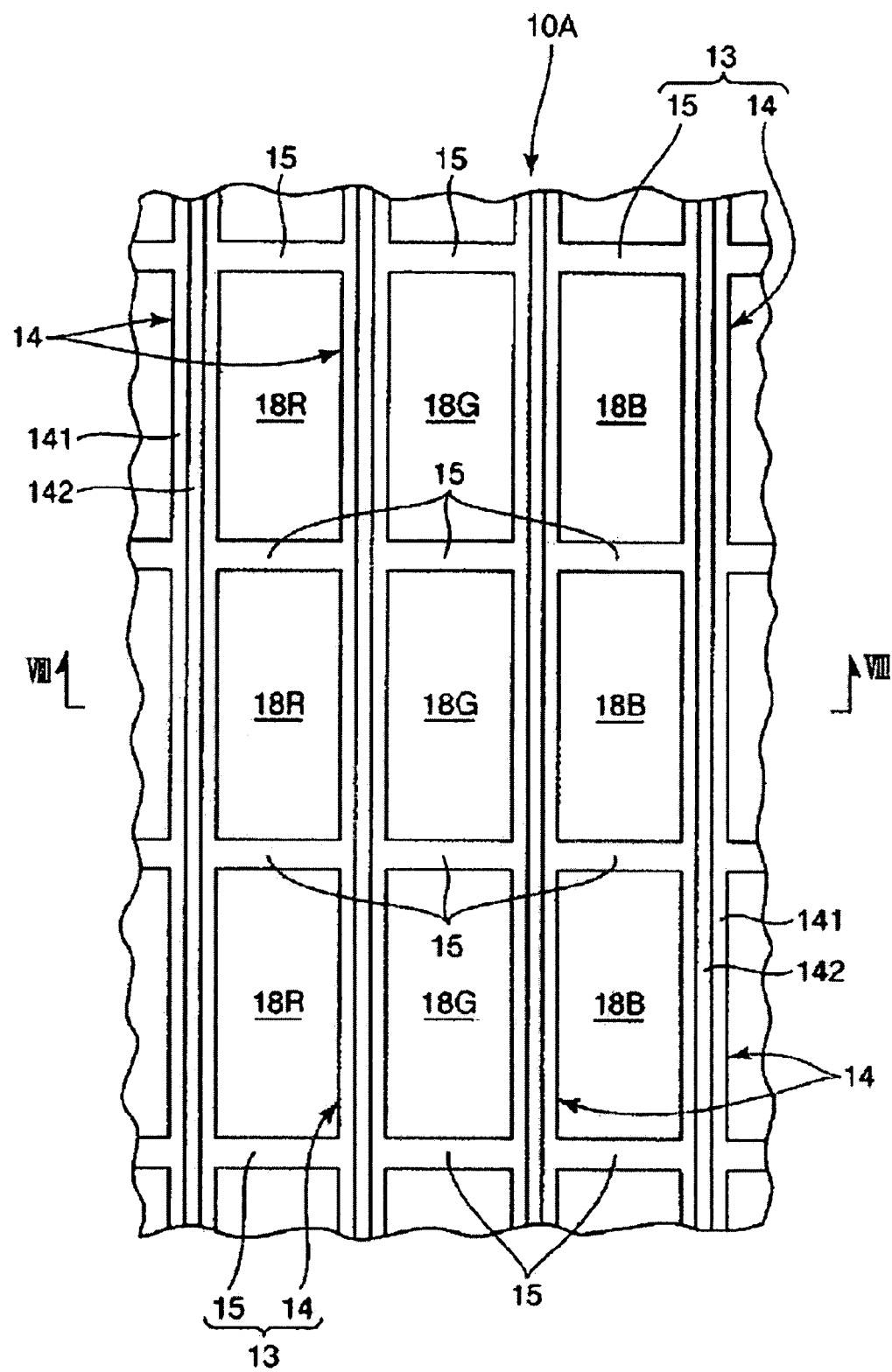
FIG. 7 is a top view showing an enlarged portion of the substrate having a bank.
Figure 8:
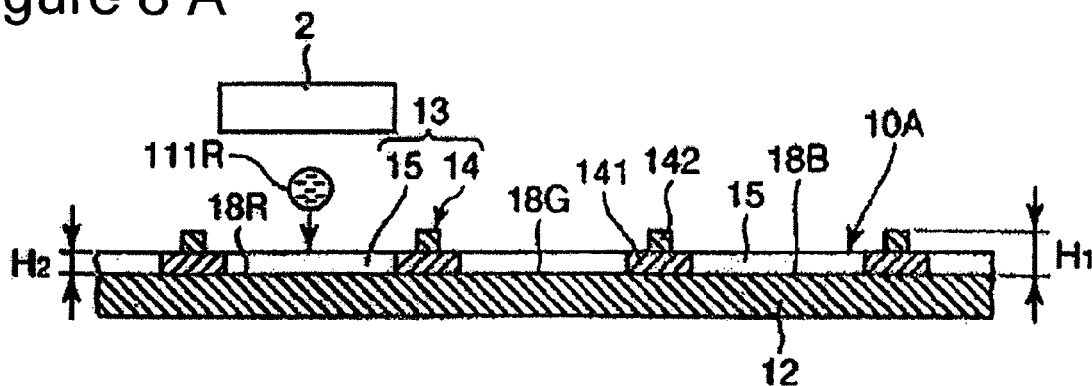
FIG. 8 is a cross-sectional diagram showing the method for manufacturing a color filter substrate using the substrate having a bank shown in FIG. 7.
Figure 8:
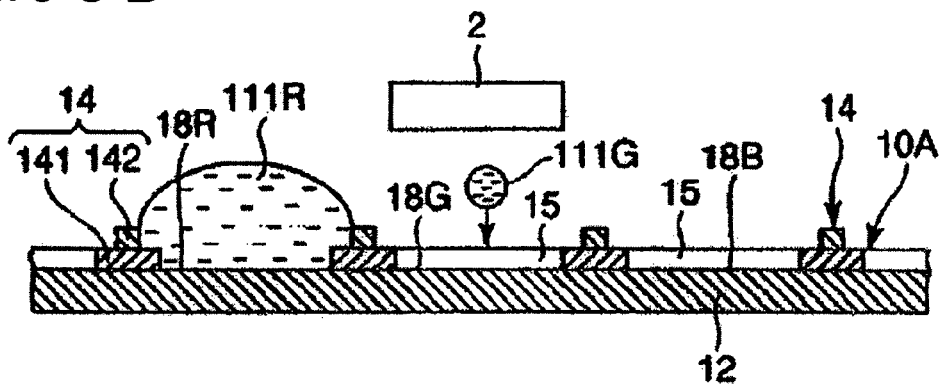
Figure 8:
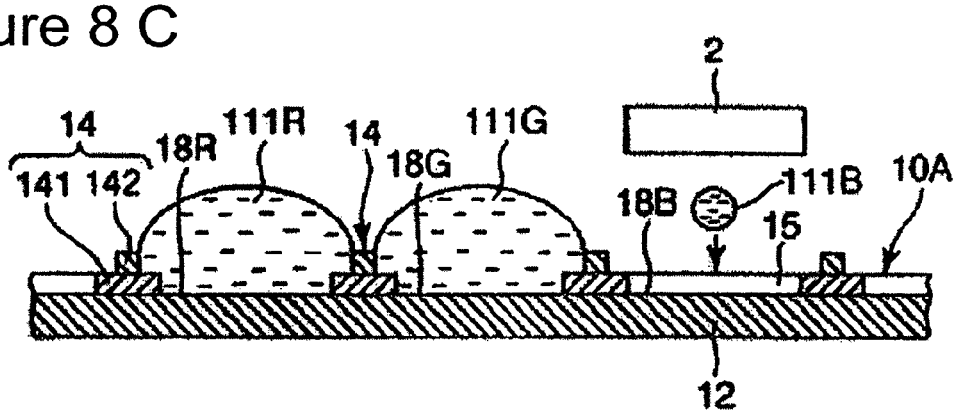
Figure 9:
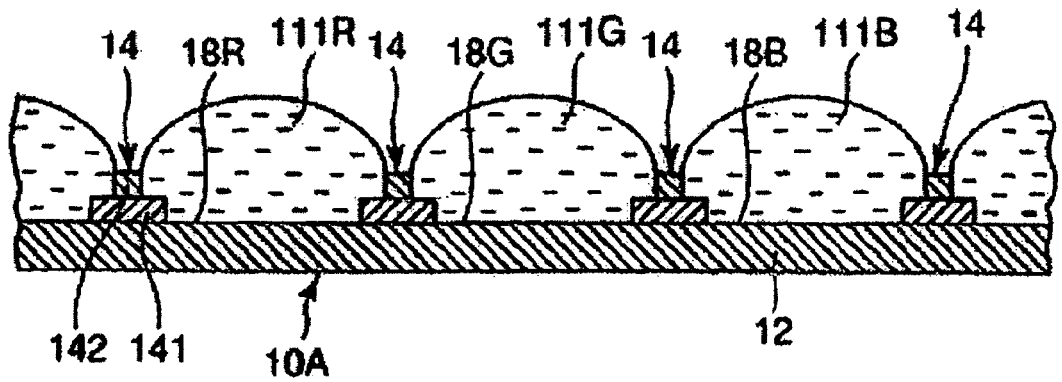
FIG. 9 is a cross-sectional diagram showing the method for manufacturing a color filter substrate using the substrate having a bank shown in FIG. 7.
Figure 9:
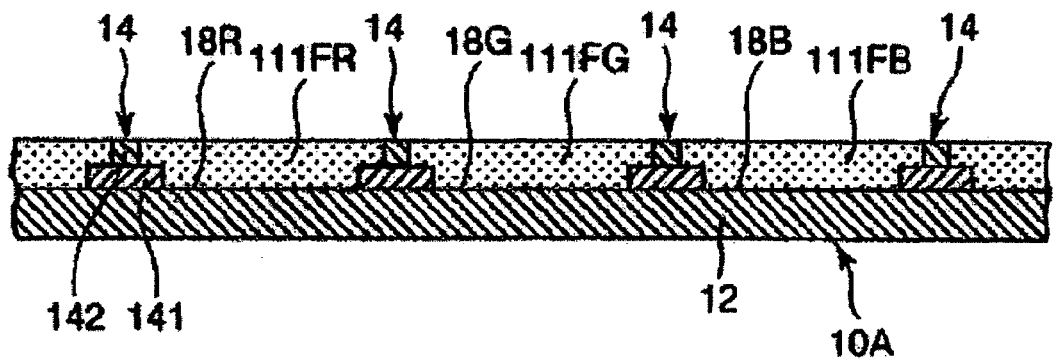
Figure 9:
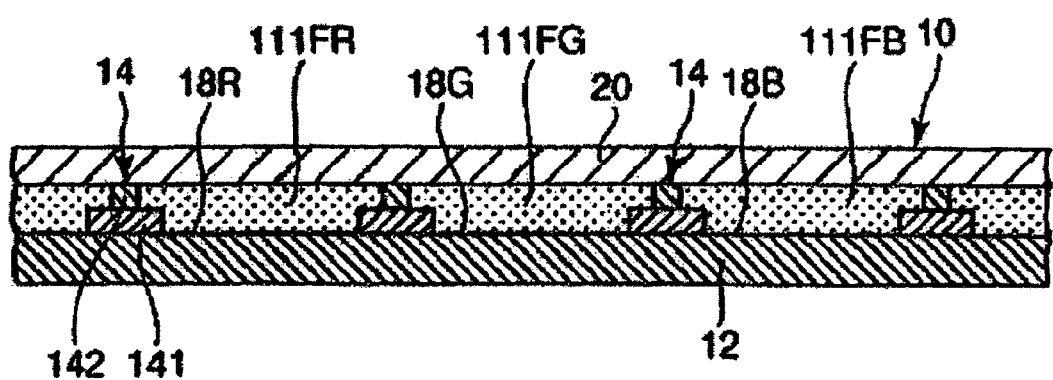

FIG. 7 is a top view showing an enlarged portion of the substrate 10A having a bank. FIGS. 8 and 9 are cross-sectional diagrams showing the method for manufacturing a color filter substrate 10 using the substrate 10A having a bank shown in FIG. 7, and are cross-sectional diagrams at the position corresponding the line VIII-VIII in FIG. 7.

In FIG. 7, the orientation of the substrate 10A having a bank is drawn so as to be offset by 90° in comparison with FIGS. 2 and 3.

As shown in these diagrams, the substrate 10A having a bank has an optically transparent glass base member 12 and a bank 13 formed on the glass base member 12. A large number of color element areas 18R, 18G, and 18B of the colors red, green, and blue are formed as a matrix by the bank 13 on the glass base member 12.

In the following description, when the red, green, and blue color element areas are differentiated, the reference numerals 18R, 18G, and 18B are affixed, and when the colors are not differentiated, the color element areas are generically referred to as "color element areas 18."

The color element areas 18R are areas in which a filter film 111FR, which is a color element film, is to be formed for exclusive emission of light in the red wavelength region, the color element areas 18G are areas in which a filter film 111FG, which is a color element film, is to be formed for exclusive emission of light in the green wavelength region, and the color element areas 18B are areas in which a filter film 111FB, which is a color element film, is to be formed for exclusive emission of light in the blue wavelength region.

The bank 13 is configured with a different-color separation bank 14 positioned between color elements of a different color and a same-color separation bank 15 positioned between color elements of the same color, as shown in FIG. 7. Specifically, the bank 13 parallel to the long-axis direction of the color element areas 18R, 18G, and 18B is the different-color separation bank 14, and the bank 13 in the direction perpendicular to the long-axis direction of the color element areas 18R, 18G, and 18B is the same-color separation bank 15.

The different-color separation bank 14 is configured with a base portion 141 and a liquid-repellent area 142 formed on the base portion 141, as shown in FIG. 8. The surface of the liquid-repellent area 142 has greater liquid repellency with respect to the liquid material 111 than the surface of the base portion 141, and the width of the liquid-repellent area 142 is narrower than the base portion 141.

The height $H_1$ of the different-color separation bank 14 is not particularly limited, but the preferred height is ordinarily about 0.5 to 3 µm.

The same-color separation bank 15 is connected to the base portion 141 of the different-color separation bank 14 and has the same height. The same-color separation bank 15 and base portion 141 have light-blocking characteristics and function as a black matrix.

The height $H_2$ of the same-color separation bank 15 is not particularly limited, but the preferred height is ordinarily about 0.1 to 1.5 µm.

The height $H_1$ of the different-color separation bank 14 is greater than the height $H_2$ of the same-color separation bank 15 by an amount equal to the liquid-repellent area 142. The ratio between the height $H_1$ of the different-color separation bank 14 and the height $H_2$ of the same-color separation bank 15 is preferably about $0.01 \leq H_2/H_1 \leq 0.99$, and is more preferably about $0.01 \leq H_2/H_1 \leq 0.5$.

Also, the liquid-repellency of the topmost surface of the different-color separation bank 14, in other words, the upper surface of the liquid-repellent area 142, with respect to the liquid material 111 is greater than the liquid repellency of the topmost surface of the same-color separation bank 15.

The contact angle of the liquid material 111 is an indicator of the liquid repellency. The contact angle $\alpha$ between the liquid material 111 and the material constituting the topmost surface of the different-color separation bank 14 is not particularly limited, but the preferred angle is ordinarily about 40 to 80°. The contact angle $\beta$ between the liquid material 111 and the material constituting the topmost surface of the same-color separation bank 15 is not particularly limited, but the preferred angle is ordinarily about 10 to 40°. The ratio between the contact angles $\alpha$ and $\beta 0$ is preferably $0.01 \leq \beta/\alpha \leq 0.99$, and is more preferably $0.01 \leq \beta/\alpha \leq 0.3$.

Following is a description of an example of a manufacturing method of the substrate 10A having a bank.

First, a thin metal layer is formed on the glass base member 12 by sputtering or vapor deposition. Examples of the metal material that may be used include metal chromium and chromium oxide. The base portion 141 and same-color separation bank 15 are thereafter formed by leaving the thin metal film in the form of a matrix by photolithography.

A resist layer having a negative photosensitive resin composition is applied so as to cover the glass base member 12, base portion 141, and same-color separation bank 15. The resist layer is exposed to light while close contact is maintained for the mask film formed on the stripe pattern corresponding to the liquid-repellent area 142 on the resist layer. A liquid-repellent area 142 is obtained by then removing the portions of the resist layer unexposed to light. A substrate 10A having a bank is obtained by the above-described procedure.

The constituent material of the liquid-repellent area 142 is not particularly limited, but a fluororesin is preferably used from the aspect of obtaining excellent liquid repellency.

The base portion 141 and same-color separation bank 15 may be configured with a black resin material (resin black) in lieu of a metal material.

In the present embodiment, the different-color separation bank 14 is configured with two layers (two steps), which are the base portion 141 and liquid-repellent area 142, but a single layer or three or more layers may also be acceptable. When the different-color separation bank 14 is configured with the same single layer as the same-color separation bank 15, the height of the two can be made different by imparting different amounts of light exposure in the lithography step and varying the percentage of film left behind.

Liquid repellency treatment and lyophilic treatment may be carried out with the aim of adjusting the liquid repellency of the surface of the different-color separation bank 14, the liquid repellency of the surface of the same-color separation bank 15, and the liquid repellency of the surface of the glass base member 12. An example of liquid repellency treatment is plasma treatment using tetrafluoromethane, and an example of lyophilic treatment is the oxygen plasma treatment under atmospheric pressure.

The film formation method of the present embodiment has a bank formation step for forming a different-color separation bank 14 and same-color separation bank 15 on the glass base member 12, as described above, and for obtaining a substrate 10A having a bank; and further has a liquid material deposition step for depositing the liquid material (color filter material) 111R, 111G, or 111B in the color element areas 18R, 18G, or 18B on the substrate 10A having a bank, and a film formation step for solidifying or curing the liquid material 111R, 111G, or 111B deposited in the color element areas 18R, 18G, or 18B and forming filter films 111FR, 111FG, and 111FB, which are color element films.

As described above, the liquid material 111R, 111G, or 111B is an organic solvent ink in which a pigment, which is a constituent material of the filter films 111FR, 111FG, and 111FB, is dissolved or dispersed in an organic solvent. Examples of the solvent preferably used in the liquid material 111 include BCTAC, diethylene glycol di-n-butyl ether, tetraethylene glycol dimethyl ether, pentaethylene glycol dimethyl ether, hexaethylene glycol dimethyl ether, propylene glycol di-n-butyl ether, and other polyhydric alcohol ethers. An acrylic resin or another resin may be contained in the liquid material 111R, 111G, or 111B.

Sequentially described in detail below are the liquid material deposition step and the film formation step.

—Liquid Material Deposition Step—

The substrate 10A having a bank on which the color element areas 18R, 18G, and 18B are formed is carried on the stage 106 of the drawing apparatus 1 and is held on the stage 106. The drawing apparatus 1 actuates the stage movement mechanism 108 to move the substrate 10A having a bank in the Y-axis direction and pass the substrate under the head unit 103 as droplets of the liquid material 111R, 111G, or 111B are discharged from the droplet discharge heads 2 to deposit the droplets in the color element areas 18R, 18G, and 18B.

In this case, the discharge timing of the droplet from the nozzles 25 of the droplet discharge heads 2 is controlled so that the droplets of red liquid material 111R land on the red color element area 18R, the droplets of green liquid material 111G land on the green color element area 18G, and the droplets of blue liquid material 111B land on the blue color element area 18B (refer to FIGS. 8A to 8C).

A plurality of droplets are deposited in the color element areas 18R, 18G, and 18B. The total amount of liquid material 111 deposited per each color element area 18R, 18G, and 18B is set in advance in accordance with the thickness of the filter film to be formed, and the amount is greater than the volume of each color element areas 18R, 18G, and 18B. Hence, the liquid material 111R, 111G, or 111B deposited in the color element areas 18R, 18G, and 18B rises above the upper surface of the bank 13, as shown in FIG. 9D.

In the present embodiment, the different-color separation bank 14 is configured so that the embankment function for partitioning the liquid material 111 is higher than the same-color separation bank 15. In other words, in the present embodiment, the different-color separation bank 14 is configured so that the embankment function for partitioning the liquid material 111 is greater than that of the same-color separation bank 15 because the height $H_1$ of the different-color separation bank 14 is greater than the height $H_2$ of the same-color separation bank 15 and because the liquid-repellency of the topmost surface of the different-color separation bank 14 is greater than the liquid-repellency of the topmost surface of the same-color separation bank 15.

For this reason, the liquid material 111 deposited to the color element areas 18 does not overflow the different-color separation bank 14, but does overflow the same-color separation bank 15. Hence, the red liquid material 111R deposited in the red color element area 18R overflows the same-color separation bank 15 and becomes joined with the red liquid material 111R deposited in the mutually adjacent color element areas 18R of the same color, as shown in FIG. 8B. In other words, the red liquid material 111R deposited in the red color element area 18R becomes joined in each column to form a semi-oval shape. In the same fashion, the green liquid material 111G deposited in the green color element area 18G, and the blue liquid material 111B deposited in the blue color element area 18B become joined in each column to form a semi-oval shape (refer to FIGS. 8C and 9D).

—Film Formation Step—

When the liquid material 111R, 111G, or 111B has been deposited in the color element areas 18R, 18G, and 18B, the substrate 10A having a bank is conveyed to a drying device (not shown), and the liquid material 111R, 111G, or 111B in the color element areas 18R, 18G, and 18B is dried. Filter layers 111FR, 111FG, and 111FB on the color element areas 18R, 18G, and 18B can thereby be obtained, as shown in FIG. 9E. When the liquid material 111R, 111G, or 111B in the drawing apparatus 1 is deposited, drying may be repeatedly carried out in the drying apparatus to ultimately form the filter layers 111FR, 111FG, and 111FB by lamination.

The substrate 10A having a bank is thereafter conveyed into an oven (not shown), and the filter layers 111FR, 111FG, and 111FB are reheated (post-baked) in the oven.

Next, the substrate 10A having a bank is conveyed to a protective film formation apparatus (not shown), and a protective layer (overcoat) 20 that covers the bank 13 and filter layers 111FR, 111FG, and 111FB is formed in the protective layer formation apparatus, as shown in FIG. 9F.

The protective layer 20 for covering the bank 13 and filter layers 111FR, 111FG, and 111FB is formed, and the protective layer 20 is then completely dried in the drying apparatus. The protective film 20 is furthermore heated and completely cured in a curing apparatus (not shown) to convert the substrate 10A to the color filter substrate 10.

In the present embodiment, the liquid material 111 deposited in the color element areas 18 in the liquid material deposition step does not overflow the different-color separation bank 14, as described above, but does overflow the same-color separation bank 15 to join with the liquid material 111 of the same color deposited in the adjacent color element areas 18 of the same color, and the liquid material 111 deposited in the color element areas 18 forms a semi-oval like shape in each of the color columns. This provides the following advantages.

The first advantage is that since the embankment function of the different-color separation bank 14 is relatively high, the liquid material 111 does not overflow the different-color separation bank 14, and situations are prevented in which a mixed color is created when the liquid material 111 becomes mixed with the liquid material 111 of a different color deposited in the color element areas 18 of a different color.

The second advantage is that since the liquid material 111 can overflow the same-color separation bank 15 and join and intermix with the liquid material 111 of the same color deposited in the adjacent color element areas 18 of the same color, the amount of liquid material 111 deposited in each color element area 18 is averaged even when there is variation in the amount of liquid material 111 deposited in the color element areas 18. Hence, the thickness of the filter layers 111FR, 111FG, and 111FB can be made uniform.

The third advantage is that since the liquid material 111 can overflow the same-color separation bank 15, the liquid material 111 can spread to every corner of the color element areas 18, thereby reliably preventing so-called colorless areas, which is a phenomenon whereby the filter film is formed only partially within the color element areas 18 or the film thickness is insufficient.

The fourth advantage is that since accuracy requirement for positioning (alignment) in the stripe direction of the substrate 10A having a bank is less stringent when droplets of the liquid material 111 are deposited using the drawing apparatus 1, drawing can be easily performed and yield is improved.

In a configuration that is different than the present embodiment, the above-described effects cannot be obtained when a different-color separation bank 14 alone is formed and a same-color separation bank 15 is not formed. When a same-color separation bank 15 is not present, the liquid material 111 deposited in the color element areas 18 too easily moves along the stripe direction of the substrate 10A having a bank, and the liquid material 111 tends to aggregate in a single location in the column of color element areas 18 due to surface tension, resulting in a loss of uniformity.

In contrast, by providing a same-color separation bank 15 of the present embodiment, the flow of the liquid material 111 can be controlled so as to make uniform the amount of liquid material 111 deposited between the color element areas 18 of the same color, while suitably achieving the effect of keeping the liquid material 111 within the color element areas 18, thus achieving the above-described effects.

In the present embodiment, the different-color separation bank 14 may be configured so that the embankment function for partitioning the liquid material 111 is higher than the same-color separation bank 15. Thus, if the height of the different-color separation bank 14 is greater than the height of the same-color separation bank 15, the same effects described above can be achieved even if the liquid-repellency of the topmost surfaces thereof is the same. Alternatively, if the liquid repellency of the topmost surface of the different-color separation bank 14 is greater than the liquid repellency of the topmost surface of the same-color separation bank 15, the same effects described above can be achieved even if the height of the different-color separation bank 14 is the same as that of the same-color separation bank 15.

Figure 10:
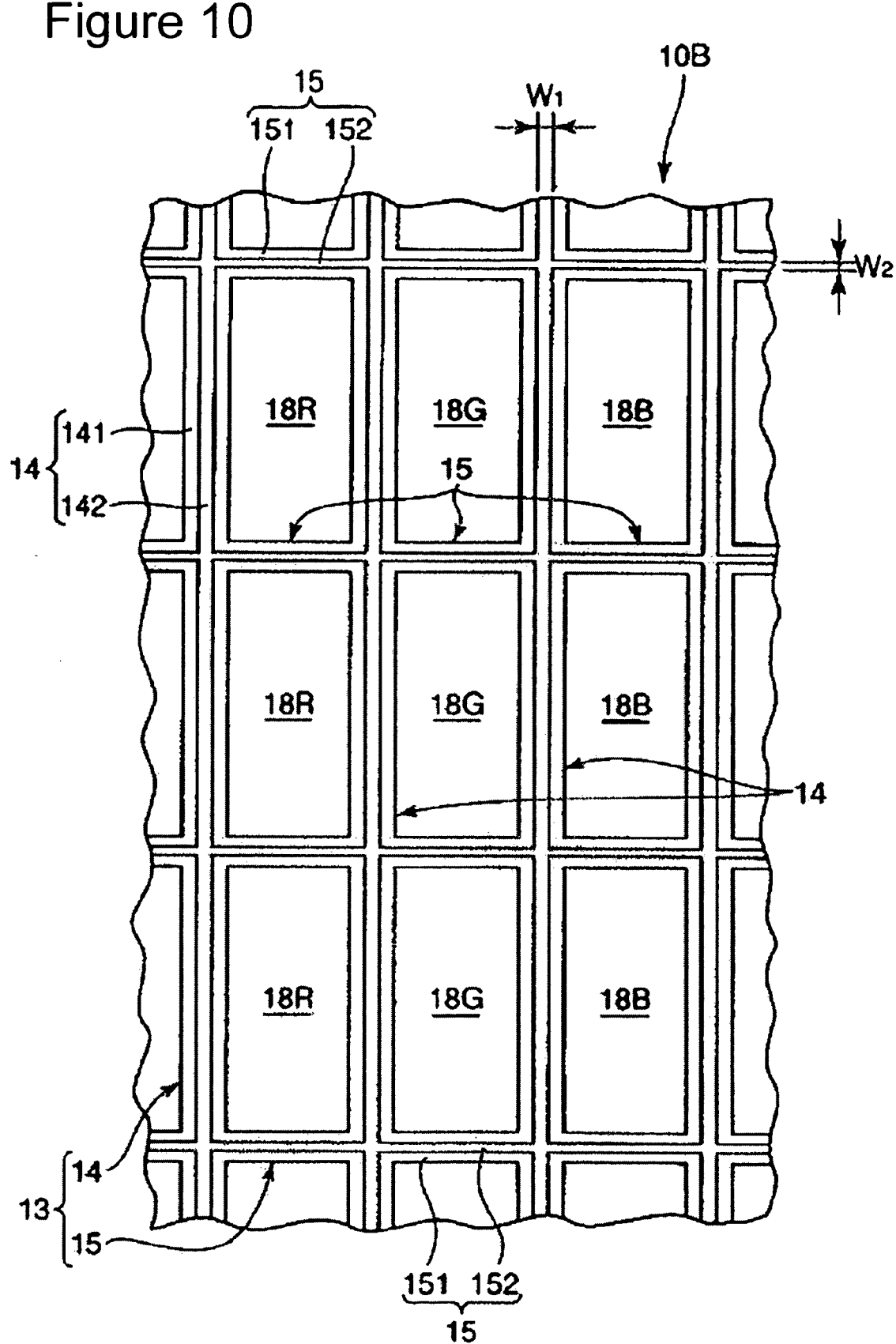
FIG. 10 is a top view showing another configuration example of the substrate having a bank of another embodiment of the invention.

FIG. 10 is a top view showing another configuration example of the substrate having a bank of another embodiment.

The substrate 10B having a bank shown in FIG. 10 is the same as the substrate 10A having a bank, except that the configuration of the same-color separation bank 15 is different.

The same-color separation bank 15 in the substrate 10B having a bank is configured with a base 151 and a liquid-repellent area 152 formed on the base 151 in the same manner as the different-color separation bank 14, the height of the base 151 and the constituent material are the same as those of the base portion 141, and the height of the liquid-repellent area 152 and the constituent material are the same as those of the liquid-repellent area 142.

However, the width $W_1$ of the liquid-repellent area 142 of the different-color separation bank 14 is greater than the width $W_2$ of the liquid-repellent area 152 of the same-color separation bank 15. The different-color separation bank 14 is thereby given an embankment function for partitioning the liquid material 111 that is higher than that of the same-color separation bank 15. Thus, the same effect as the case in which the substrate 10A having a bank is used can be obtained with the substrate 10B having a bank Thus, in the present embodiment, the width $W_1$ of the liquid-repellent area 142 of the different-color separation bank 14 may be greater than the width $W_2$ of the liquid-repellent area 152 of the same-color separation bank 15, even if the entire height and liquid-repellency of the topmost surface of the different-color separation bank 14 and same-color separation bank 15 are equal to each other. In this case, the ratio between the width $W_1$ of the liquid-repellent area 142 of the different-color separation bank 14 and the width $W_2$ of the liquid-repellent area 152 of the same-color separation bank 15 is preferably about $W_2/W_1 \leq 0.99$, and is more preferably about $W_2/W_1 \leq 0.5$.

The application of the embodiment described above is not limited to the manufacture of a color filter substrate 10, but application may also be made to the manufacture of an electroluminescent display apparatus or another type of image display device, for example.

Figure 11:
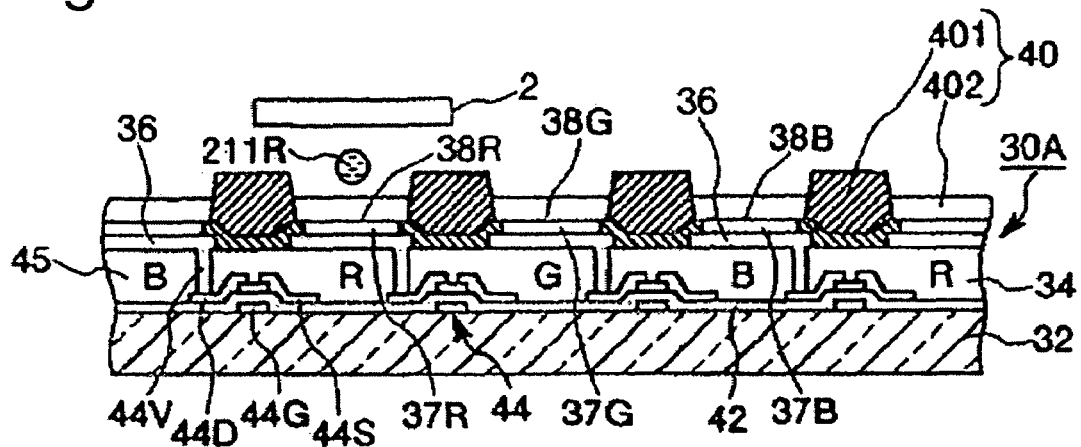
FIG. 11 is a cross-sectional diagram showing the film formation method of still another embodiment of the invention in which a substrate having color elements is applied to an organic electroluminescent display apparatus.
Figure 11:
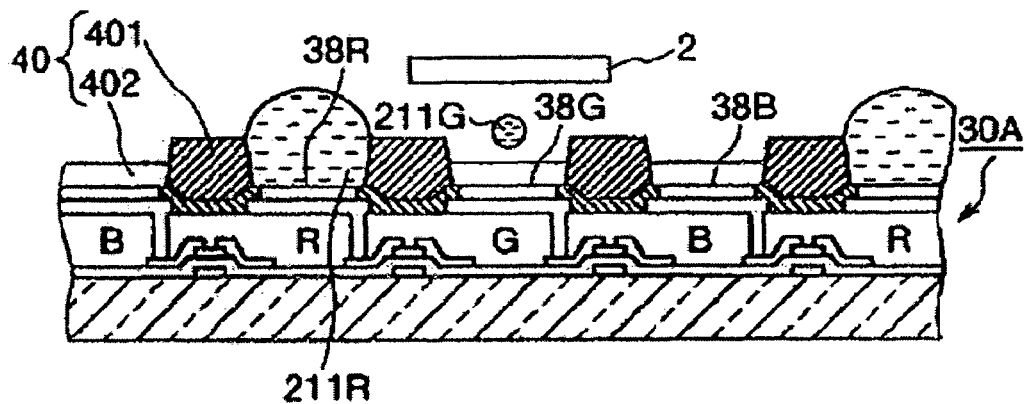
Figure 11:
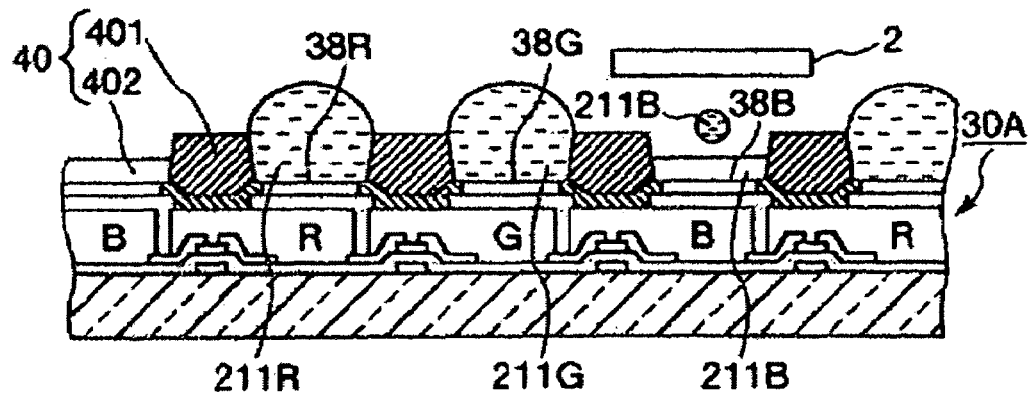
Figure 12:
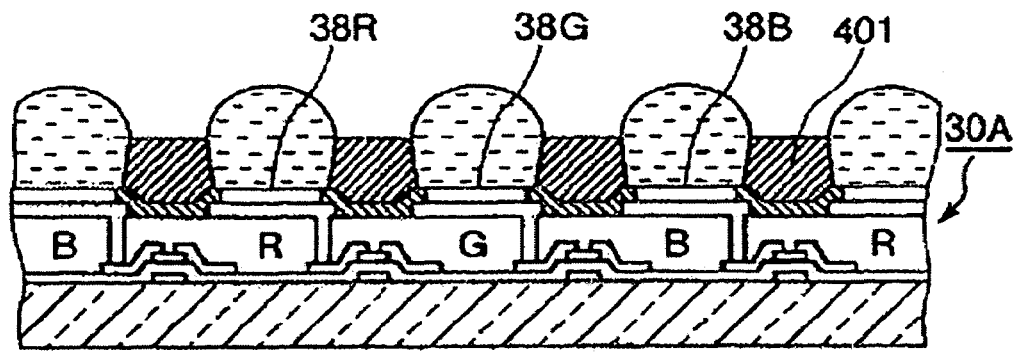
FIG. 12 is a cross-sectional diagram showing the film formation method of the embodiment of FIG. 11 in which a substrate having color elements is applied to an organic electroluminescent display apparatus.
Figure 12:
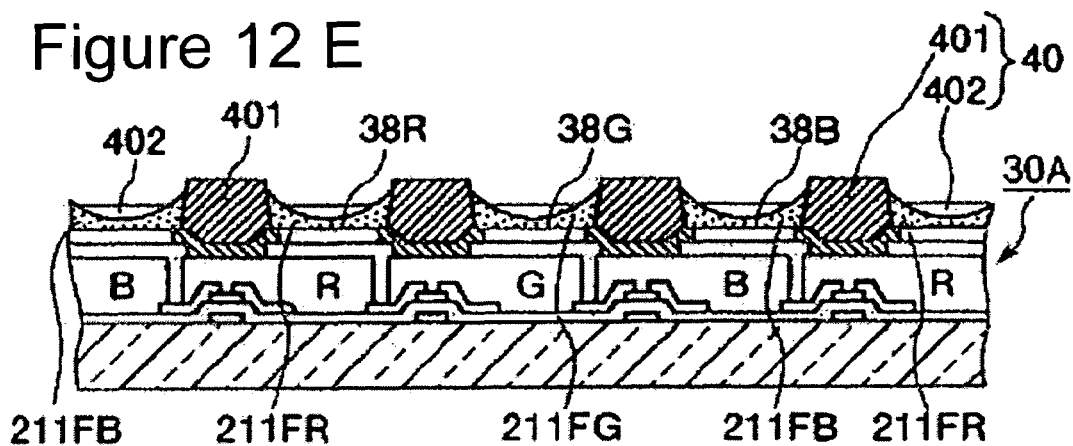
Figure 12:
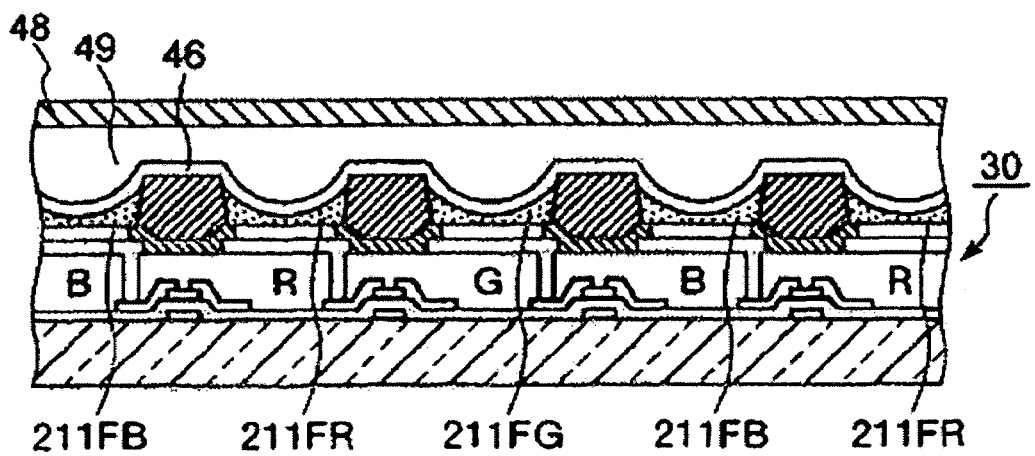

FIGS. 11 and 12 are cross-sectional diagrams showing the film formation method for the case in which a substrate having color elements in which the above described embodiment is applied to an organic electroluminescent display apparatus 30. The case in which the organic electroluminescent display apparatus 30 is manufactured using the present embodiment is described below, but the discussion will focus on the points of difference from the case in which the color filter substrate 10 is manufactured, and a description of the similar points is omitted.

The substrate 30A having a bank shown in FIGS. 11 and 12 is a substrate for manufacturing an organic electroluminescent display apparatus 30. A plurality of color element areas 38R, 38G, and 38B of the colors red, green, and blue aligned in a stripe array in the form of a matrix are disposed on the substrate 30A having a bank, and the color element areas 38R, 38G, and 38B are surrounded by a bank 40. The red color element areas 38R are areas in which a luminous film 211FR, which is a color element film, is to be formed for emission of light in the red wavelength region; the color element areas 38G are areas in which a luminous film 211FG, which is a color element film, is to be formed for emission of light in the green wavelength region; and the color element areas 38B are areas in which a filter film 211FB, which is a color element film, is to be formed for emission of light in the blue wavelength region.

Specifically, the substrate 30A has a bank has a glass substrate 32, a circuit element layer 34 formed on the glass substrate 32, a plurality of pixel electrodes 36 formed on the circuit element layer 34, and a bank 40 formed between the plurality of pixel electrodes 36. The glass substrate 32 is optically transparent to visible light. The plurality of pixel electrodes 36 are electrodes that are optically transparent to visible light, and are ITO (Indium Tin Oxide) electrodes, for example. The plurality of pixel electrodes 36 are disposed in the form of a matrix on the circuit element layer 34, and each specify color element areas 38R, 38G, and 38B.

The bank 40 is configured with a different-color separation bank 401 positioned between the color elements of different colors, and a same-color separation bank 402 positioned between color elements of the same color. More specifically, the different-color separation bank 401 is formed in the direction perpendicular to the paper surface of FIGS. 11 and 12, the same-color separation bank 402 is formed in the direction parallel to the paper surface of FIGS. 11 and 12, and the different-color separation bank 401 and same-color separation bank 402 form a lattice shape. The different-color separation bank 401 and same-color separation bank 402 are composed of an inorganic layer formed on the circuit element layer 34 and an organic layer positioned on the inorganic layer, respectively.

The height of the different-color separation bank 401 is greater than that of the same-color separation bank 402. The liquid repellency of the topmost surface of the different-color separation bank 401 is preferably greater than the liquid repellency of the topmost surface of the same-color separation bank 402.

The circuit element layer 34 is a layer that has a plurality of scanning electrodes extending in a prescribed direction on the glass substrate 32, an insulation film 42 formed so as to cover the plurality of scanning electrodes, a plurality of signal electrodes that are positioned on the insulation layer 42 and that extend in the direction orthogonal to the direction in which the plurality of scanning electrodes extend, a plurality of switching electrodes 44 positioned in the vicinity of the intersection of scanning electrodes and signal electrodes, and an interlayer insulation film 45 composed of polyimide or the like formed so as to cover the plurality of switching devices 44. Gate electrodes 44G and source electrodes 44S of the switching elements 44 are electrically connected to the corresponding scanning electrodes and corresponding signal electrodes. A plurality of pixel electrodes 36 are positioned on the interlayer insulation film 45. Through holes 44V are formed in the interlayer insulation film 45 in locations that corresponds to the drain electrodes 44D of the switching elements 44, and electrical connections are formed between the switching elements 44 and the corresponding pixel electrodes 36 via the through holes 44V. Also, the switching elements 44 are set in corresponding positions in the bank 40.

This type of substrate 30A having a bank can be manufactured using known film production methods and patterning techniques. Corresponding hole-transport layers 37R, 37G, and 37B may be formed on each of the pixel electrodes 36. The luminous efficiency of the electroluminescent display apparatus is increased when the hole-transport layers 37R, 37G, and 37B are positioned between the pixel electrodes 36 and the luminescent layers 211FR, 211FG, and 211FB described below.

—Liquid Material Deposition Step—

The liquid material 211R, 211G, or 211B is deposited in the color element areas 38R, 38G, and 38B, respectively, using the drawing apparatus 1 of the present embodiment in the same fashion as the color filter substrate 10 described above, as shown in FIGS. 11A to 11C, on the substrate 30A having a bank on which the color element areas 38R, 38G, and 38B are formed as described above.

The red liquid material 211R deposited in the red color element area 38R exceeds the different-color separation bank 401 and joins with the red liquid material 211R deposited in the mutually adjacent red color element areas 38R of the same color. In other words, the red liquid material 211R deposited in the red color element areas 38R joins in each column and forms a semi-oval shape. In the same fashion, the green liquid material 211G deposited in the green color element areas 38G, and the blue liquid material 211B deposited in the blue color element areas 38B also join in each column and form a semi-oval shape (refer to FIGS. 11C and 12D).

The red liquid material 211R contains a red-colored organic luminous material; the green liquid material 211G contains a green-colored organic luminous material; and the blue liquid material 211B contains a blue-colored organic luminous material. The liquid material 211R, 211G, or 211B is obtained by dissolving or dispersing in an organic solvent a luminous material, which is a constituent material of the luminescent films 211FR, 211FG, and 211FB of the subsections of the organic electroluminescent display apparatus 30.

—Film Formation Step—

The substrate 30A having a bank is thereafter conveyed to the drying apparatus, and the luminescent films 211FR, 211FG, and 211FB on the color element areas 38R, 38G, and 38B are obtained, as shown in FIG. 12E, by drying the liquid material 211R, 211G, or 211B deposited in the color element areas 38R, 38G, or 38B.

Next, a counter electrode 46 is disposed so as to cover the bank 40 and the luminescent layers 211FR, 211FG, and 211FB. The counter electrode 46 functions as a negative electrode.

A sealing substrate 48 and the substrate 30A having a bank are then mutually bonded to the surrounding area to obtain the organic electroluminescent display apparatus 30 shown in FIG. 12F. Inert gas 49 is sealed between the sealing substrate 48 and the substrate 30A having a bank.

The light emitted from the luminescent layers 211FR, 211FG, and 211FB in the organic electroluminescent display apparatus 30 is emitted via the pixel electrodes 36, the circuit element layer 34, and the carrier substrate 32. An electroluminescent display apparatus that emits light via a circuit element layer 34 in this manner is referred to as a bottom-emission display apparatus.

In an organic electroluminescent display apparatus 30 such as that described above, a high quality image can be obtained without color unevenness because the thickness of luminescent layers 211FR, 211FG, and 211FB can be made uniform while reliably preventing colorless areas and mixed colors from forming between the color elements of different colors for the same reasons as that of the color filter substrate 10.

Described above is the case in which the present embodiment is applied to a liquid crystal display apparatus (color filter substrate) and to an electroluminescent display apparatus, but no limitation is imposed thereby, and the present embodiment may also be applied to the back surface substrate of a plasma display apparatus, an image display apparatus provided with an electron emission device (also referred to as an SED (Surface-Conduction Electron-Emitter Display) or an FED (Field Emission Display)).

Embodiments of the Electronic Equipment

A liquid crystal display apparatus provided with the color filter substrate 10 manufactured with a method such as that described above, and an electroluminescent display apparatus or another image display apparatus 1000 manufactured with a method such as that described above can be used in the display unit of electronic equipment.

Figure 13:
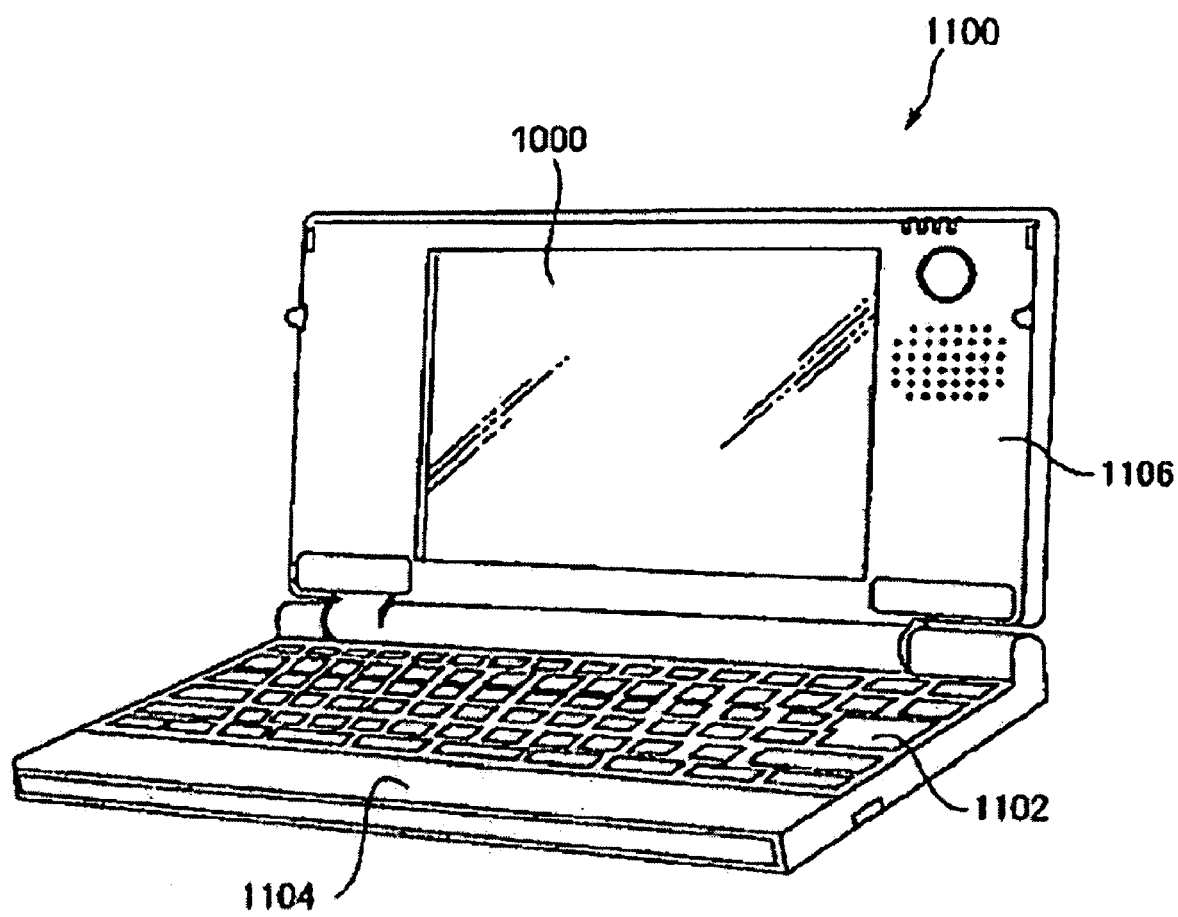
FIG. 13 is a perspective view showing the configuration of a mobile personal computer (notebook) to which the electronic equipment in accordance with still another embodiment of the invention.

FIG. 13 is a perspective view showing the configuration of a mobile personal computer (notebook) as an embodiment of the electronic equipment.

The personal computer 1100 in the diagram is configured with a display unit 1106 and a main unit 1104 provided with a keyboard 1102. The display unit 1106 is rotatably supported by way of a hinge mechanism on the main unit 1104.

The display unit 1106 in the personal computer 1100 is provided with an image display unit 1000.

Figure 14:
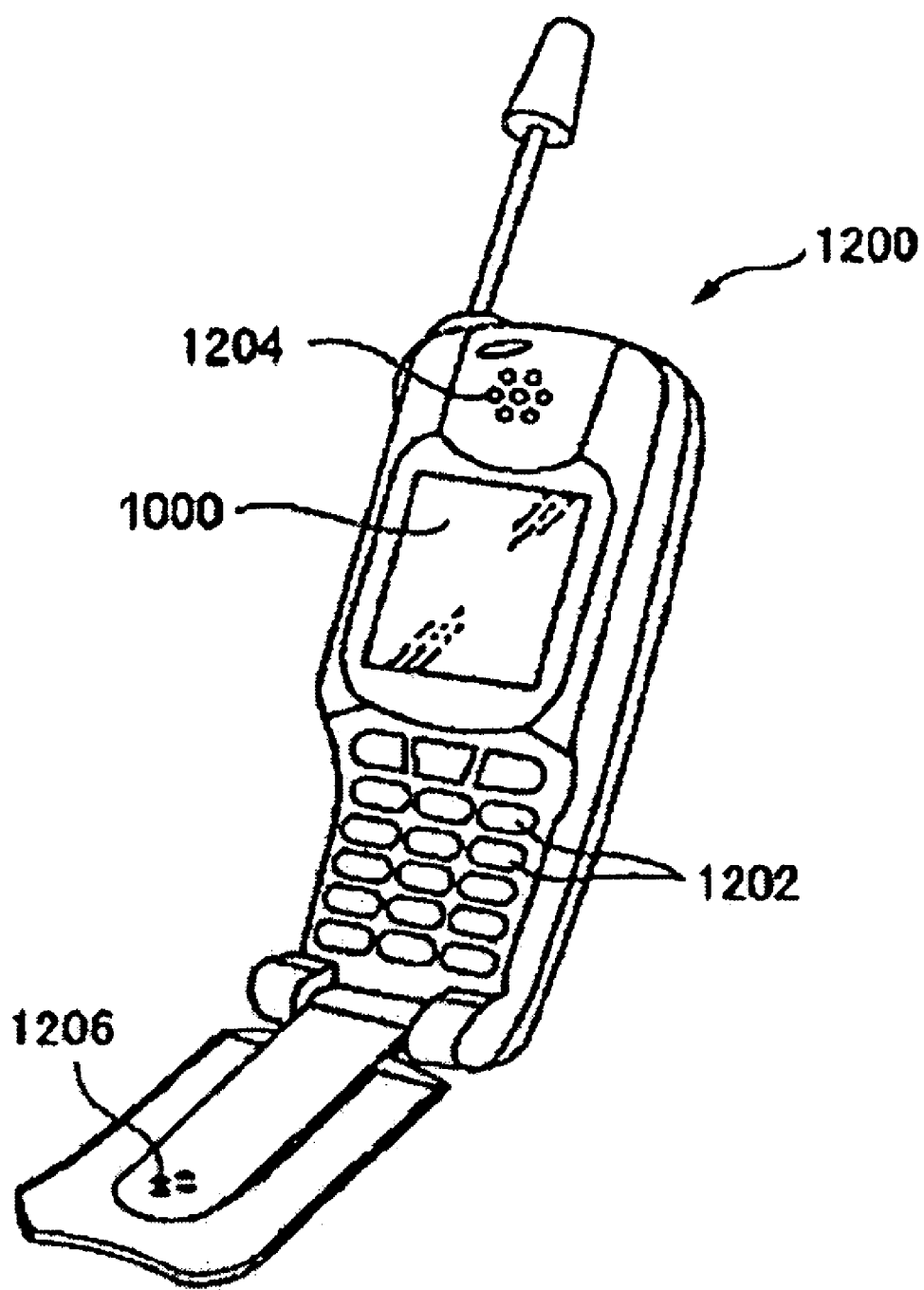
FIG. 14 is a perspective view showing the configuration of a mobile telephone (including PHS) to which the electronic equipment in accordance with still another embodiment of the invention.

FIG. 14 is a perspective view showing the configuration of a mobile telephone (including PHS) as another embodiment of the electronic equipment.

The mobile telephone 1200 in the diagram is configured with a plurality of operating buttons 1202, an earpiece 1204, and a mouthpiece 1206; and an image display device 1000 is provided to the display unit.

Figure 15:
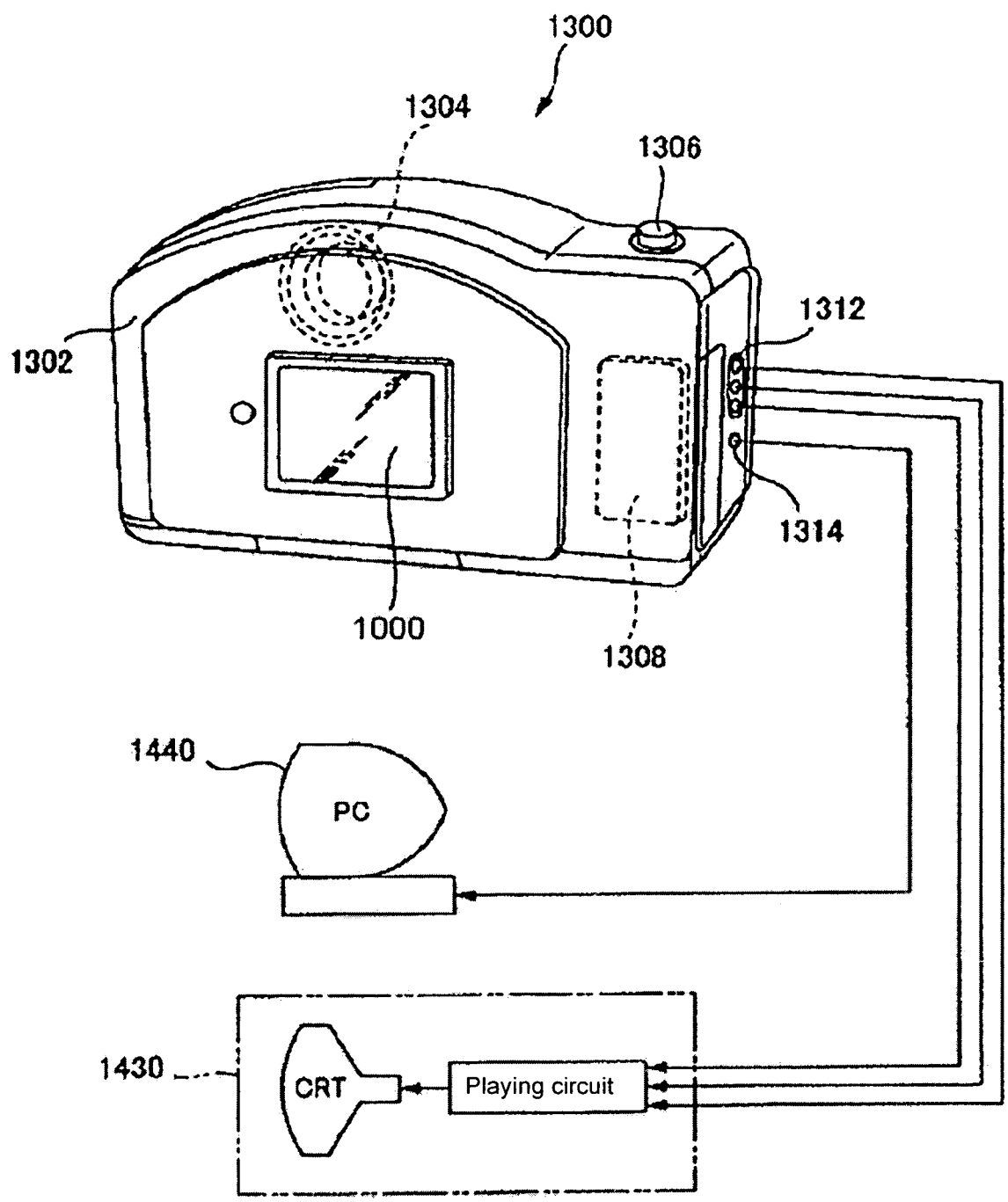
FIG. 15 is a perspective view showing the configuration of a digital still camera to which the electronic equipment in accordance with still another embodiment of the invention.

FIG. 15 is a perspective view showing the configuration of a digital still camera as still another embodiment of the electronic equipment. The connections to external equipment are shown in a simplified manner in this diagram.

Here, an ordinary camera exposes a silver salt photographic film to the light image of a photographed object, whereas a digital still camera 1300 generates a picture signal (image signal) of the light image of a photographed object via photoelectric exchange using a CCD (Charge Coupled Device) or another image pickup device.

An image display apparatus 1000 is disposed in the display unit on the backside of the case (body) 1302 in the digital still camera 1300, is configured to display the picture signal produced by the CCD, and is made to function as a finder that displays a photographed object as an electronic image.

A circuit board 1308 is disposed inside the case, and the circuit board 1308 is provided with memory that can store (save) picture signals.

A photodetector 1304 that includes an optical lens (picture optical system), CCD, and the like is disposed on the front side (the reverse side in the diagramed configuration) of the case 1302.

The photographer confirms the object to be photographed that is displayed in the display unit, and when the shutter button 1306 is pressed, the picture signal of the CCD at that point in time is transmitted and stored in the memory of the circuit board 1308.

In the digital still camera 1300, a video signal output terminal 1312 and an I/O terminal 1314 for data communication are disposed on the side of the case 1302. A television monitor 1430 is connected as needed to the video signal output terminal 1312, and a personal computer 1440 is connected as needed to the I/O terminal 1314 for data communication, as shown in the diagram. A picture signal stored in the memory of the circuit board 1308 can be output to the television monitor 1430 and the personal computer 1440 by carrying out a prescribed operation.

The electronic equipment of the present invention may be the above-described personal computer (mobile personal computer), mobile phone, and digital still camera, and may additionally be televisions, video cameras, video tape recorders with viewfinders or direct-view monitors, car navigation systems, pagers, personal digital assistants (including those with a communication function), electronic dictionaries, calculators, electronic game equipment, word processors, work stations, TV phones, security TV monitors, electronic binoculars, POS terminals, and all types of equipment provided with a touch panel (electronic clinical thermometers, sphygmomanometers, blood glucose sensors, ECG display equipment, ultrasonic diagnostic equipment, display equipment for endoscopes), fish finders, all types of measuring equipment, gauges (gauges for vehicle, aircraft, and ships, for example), flight simulators, all types of monitors, projectors, and other projection display devices, and the like.

The substrate having color elements, the film formation method, the electro optical device, and the electronic equipment of the present invention were described using the embodiments shown in the diagrams, but the present invention is not limited thereto. The components comprising the substrate having color elements, electro optical device, and electronic equipment can be substituted with any configuration that is capable of demonstrating the same function. Also, any component may be added.

The present invention is not limited to a substrate having color elements in a stripe array, and application can also be made to substrates having color elements in a delta array, mosaic array, or another array pattern.

This application claims priority to Japanese Patent Application No. 2005-012411. The entire disclosure of Japanese Patent Application No. 2005-012411 is hereby incorporated herein by reference.

What is claimed is:

1. A substrate having color elements, comprising:
    a base member;
    a bank formed over the base member, the bank defining a plurality of color element areas; and
    color element films formed of liquid materials of a plurality of colors deposited in the color element areas;
    the bank having a different-color separation bank portion positioned between color element films of different colors, and a same-color separation bank portion positioned between color element films of the same color,
    a liquid-repellency of an uppermost surface of the different-color separation bank portion with respect to the liquid materials being greater than a liquid-repellency of an uppermost surface of the same-color separation bank portion with respect to the liquid materials.

2. The substrate having color elements according to claim 1, wherein
    the uppermost surface of the different-color separation bank portion and the uppermost surface of the same-color separation bank portion satisfy $0.01 \leq \beta/\alpha \leq 0.99$, where $\alpha$ is a contact angle between the liquid materials and material forming the uppermost surface of the different-color separation bank portion, and $\beta$ is a contact angle between the liquid materials and material forming the uppermost surface of the same-color separation bank portion.

3. The substrate having color elements according to claim 1, wherein
    the plurality of color element areas are arranged in a stripe pattern.

4. An electro optical device provided with the substrate having color elements according to claim 1.

5. An electronic equipment provided with the electro optical device according to claim 4.

6. A substrate having color elements comprising:
    a base member;
    a bank formed over the base member, the bank defining a plurality of color element areas; and
    color element films formed of liquid materials of a plurality of colors deposited in the color element areas,
    the bank having a different-color separation bank portion positioned between color element films of different colors, and a same-color separation bank portion positioned between color element films of the same color, the different-color separation bank portion of the bank having a base portion and a liquid-repellent portion which is formed on the base portion, a liquid-repellency of the liquid-repellent portion with respect to the liquid materials being greater than a liquid-repellency of the base portion with respect to the liquid materials, the same-color separation bank portion of the bank also having a base portion and a liquid-repellent portion which is formed on the base portion, a liquid-repellency of the liquid-repellent portion of the same-color separation bank portion with respect to the liquid materials being greater than a liquid-repellency of the base portion of the same-color separation bank portion with respect to the liquid materials, and a width of the liquid-repellent portion of the different-color separation bank portion being greater than a width of the liquid-repellent portion of the same-color separation bank portion.

7. The substrate having color elements according to claim 6, wherein the width of the liquid-repellent portion of the different-color separation bank portion and the width of the liquid-repellent portion of the same-color separation bank portion satisfy $$W_2/W_1 \leqq 0.99,$$

where $W_1$ is the width of the liquid-repellent portion of the different-color separation bank portion and $W_2$ is the width of the liquid-repellent portion of the same-color separation bank portion.

8. The substrate having color elements according to claim 6, wherein the plurality of color element areas are arranged in a stripe pattern.

* * * * *